United States Patent
Cheng et al.

(10) Patent No.: US 7,602,859 B2
(45) Date of Patent: Oct. 13, 2009

(54) CALIBRATING INTEGRATING RECEIVERS FOR SOURCE SYNCHRONOUS PROTOCOL

(75) Inventors: Roger K. Cheng, San Jose, CA (US); Harishankar Sridharan, Folsom, CA (US); Navneet Dour, Folsom, CA (US); Hing Y. To, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 11/118,228

(22) Filed: Apr. 28, 2005

(65) Prior Publication Data

US 2006/0245519 A1 Nov. 2, 2006

(51) Int. Cl.
*H04L 27/00* (2006.01)

(52) U.S. Cl. .................. 375/316; 375/224; 375/226; 375/354; 375/371

(58) Field of Classification Search ............ 375/316, 375/326, 327, 354, 355, 373, 374, 375, 376, 375/224, 226, 371
See application file for complete search history.

(56) References Cited

U.S. PATENT DOCUMENTS 5,731,723 A * 3/1998 Chen ..................... 327/157
6,247,138 B1 * 6/2001 Tamura et al. ............ 713/600
6,509,762 B1 * 1/2003 Moss et al. ................ 327/12
6,621,760 B1 * 9/2003 Ahmad et al. ........... 365/233.1
6,628,154 B2 * 9/2003 Fiscus .................... 327/158
6,707,723 B2    3/2004 Jeong
6,848,058 B1 * 1/2005 Sinclair et al. ............ 713/322
7,038,953 B2 * 5/2006 Aoki .................... 365/189.05
7,157,948 B2 * 1/2007 McClannahan et al. ..... 327/151
7,171,321 B2 * 1/2007 Best ........................ 702/106
7,180,345 B2 * 2/2007 Atha et al. ................ 327/172
7,227,395 B1 * 6/2007 Huang et al. .............. 327/161
2003/0174249 A1 * 9/2003 Grillo ....................... 348/572
2005/0047192 A1 * 3/2005 Matsui et al. ............. 365/145
2005/0118980 A1 * 6/2005 Pai et al. .................. 455/340
2006/0033544 A1 * 2/2006 Hui et al. ................. 327/276

* cited by examiner

*Primary Examiner*—Shuwang Liu
*Assistant Examiner*—Kenneth Lam
(74) *Attorney, Agent, or Firm*—Blakely, Sokoloff, Taylor & Zafman LLP

(57) ABSTRACT

An embodiment of the present invention is a technique to calibrate an integrating receiver. A delay calibration circuit calibrates an adjusting code of a chain of delay elements and positioning of at least an integrating strobe used to define an integration window for the integrating receiver. An integrating receiver pulse generator generates an IR pulse from the at least integrating strobe. A calibration controller controls calibrating the adjusting code and the positioning of the at least integrating strobe.

27 Claims, 21 Drawing Sheets

CALIBRATING INTEGRATING RECEIVERS FOR SOURCE SYNCHRONOUS PROTOCOL

BACKGROUND

1. Field of the Invention

Embodiments of the invention relate to the field of microprocessors, and more specifically, to data receivers.

2. Description of Related Art

In a source synchronous protocol for memory interface between a memory controller and a memory device, the data is sent from a source to a receiver together with a clock, or a data strobe. The receiver uses the data strobe to latch the data. In double pumped mode, the data is captured on the rising and falling edges of the data strobe. When the memory controller initiates a read, the memory device sends both the data and the data strobe edge aligned to the memory controller clock so that the memory controller may shift the incoming strobe 90 degrees to latch the data. However, noise that may occur during the sampling may cause the receiver to sample the wrong data, causing unreliable operations. Similar problems may exist for other strobing modes such as single and quad-pumped modes.

The data strobe may be delayed by a controllable time delay using a delay locked loop (DLL). The data strobe jitter, however, may propagate to the output. It is difficult to limit the delay within a minimum value and a maximum value of the data valid window. Lastly, the throughput delay does not scale well with high frequencies and the minimum delay may become a large factor. Traditional receiver techniques do not provide sufficient margin at higher frequencies to allow for a positive data valid window. When the alignment of the data and the strobe is skewed, the integrating receiver may evaluate incorrect data due to the non-ideal data valid window caused by the skew. Several factors may cause skewed alignment such as trace skew, system noise, dynamic random access memory (DRAM) duty cycle error, etc. These factors typically exist in high frequency operations, leading to unreliable data capture.

BRIEF DESCRIPTION OF THE DRAWINGS

Embodiments of invention may best be understood by referring to the following description and accompanying drawings that are used to illustrate embodiments of the invention. In the drawings.

DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

One embodiment of the invention is a technique to integrate data received in a read operation using integrating receivers. The integrating receivers may be used in a data receiver interface circuit in many applications such as general computing, graphics, set-top boxes, interactive video, networking, network storage, mobile phone imaging, digital video/versatile disk (DVD) recorder, high performance audio processing, etc. The technique provides low power consumption, scalability to accommodate high frequencies, and optimal margined integration window.

Figure 1A:
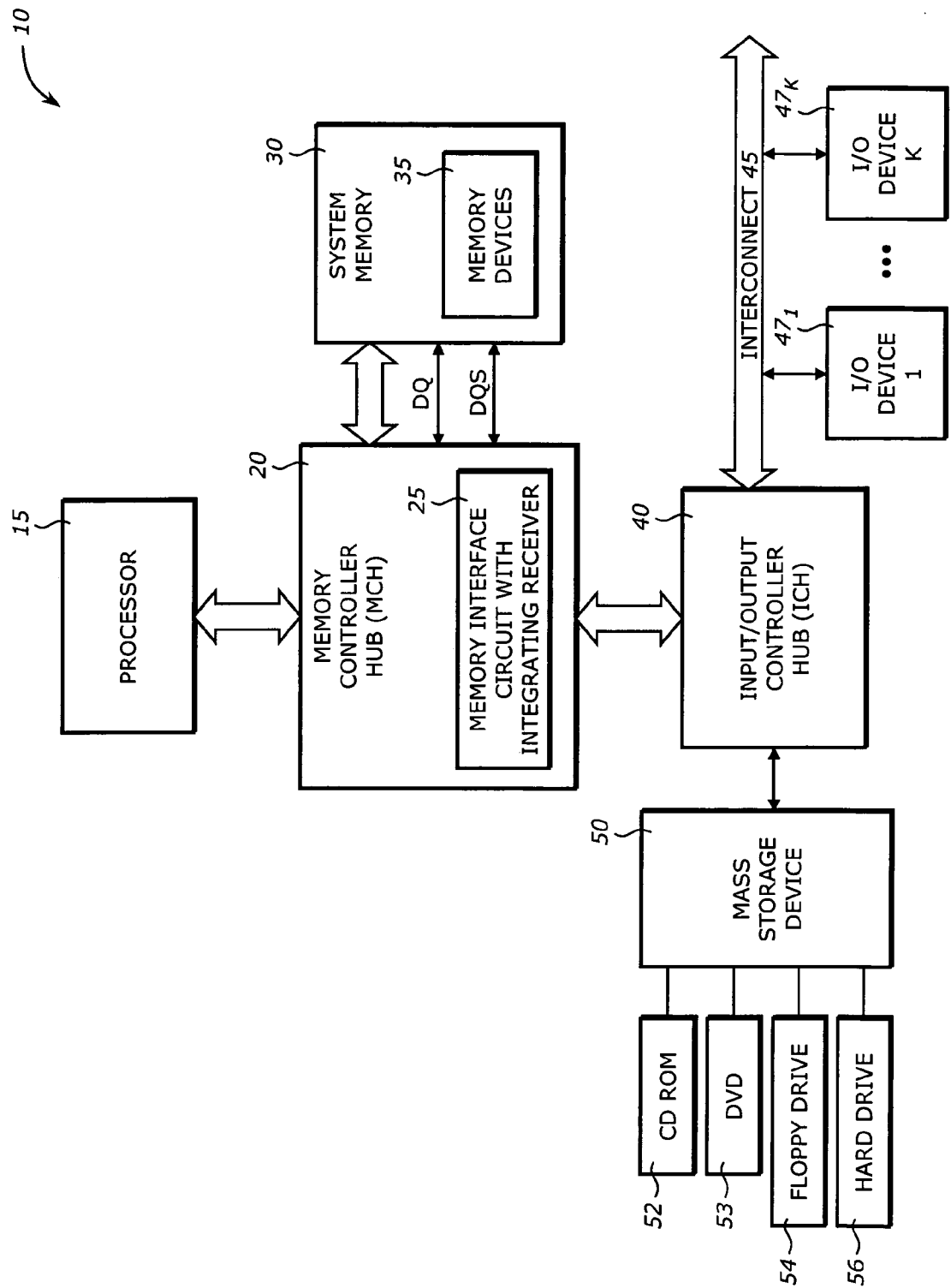
FIG. 1A is a diagram illustrating a processing system in which one embodiment of the invention can be practiced.

FIG. 1A is a diagram illustrating a processing system 10 in which one embodiment of the invention can be practiced. The system 10 includes a processor unit 15, a memory controller hub (MCH) 20, a main memory 30, an input/output controller hub (IOH) 40, an interconnect 45, a mass storage device 50, and input/output (I/O) devices $47_1$ to $47_K$.

The processor unit 15 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MCH 20 provides control and configuration of memory and input/output devices such as the main memory 30 and the ICH 40. The MCH 20 may be integrated into a chipset that integrates multiple functionalities such as graphics, media, isolated execution mode, host-to-peripheral bus interface, memory control, power management, etc. The memory controller circuit in the MCH 120 includes a memory interface circuit 25 using integrating receivers (IRs). The memory interface circuit 25 provides enhanced performance for memory read cycles using a source synchronous protocol. The MCH 20 or the memory controller functionality in the MCH 20 may be integrated in the processor unit 15. In some embodiments, the memory controller, either internal or external to the processor unit 15, may work for all cores or processors in the processor unit 15. In other embodiments, it may include different portions that may work separately for different cores or processors in the processor unit 15.

The main memory 30 stores system code and data. The main memory 30 is typically implemented with dynamic random access memory (DRAM), static random access memory (SRAM), or any other types of memories including those that do not need to be refreshed. The main memory 30 may include multiple channels of memory devices 25 such as synchronous DRAMs (SDRAMs). The SDRAMs may be Double Data Rate (DDR). Typical operating memory speed may be 400 MHz. The memory devices 35 in the main memory 30 use data (DQ) and data strobe (DQS) in read and write cycles. In a source synchronous protocol, the DQ and DQS signals have well defined timing relationships. For example, in the read cycle, the DQ and DQS signals may be edge-aligned. In the following, the terms "data" and "strobe" are used to indicate the "data signal" and the "strobe signal", respectively. The term "data" may also be use to indicate any source of information received by a receiver.

The ICH 40 has a number of functionalities that are designed to support I/O functions. The ICH 40 may also be integrated into a chipset together or separate from the MCH 20 to perform I/O functions. The ICH 45 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, etc.

The interconnect 45 provides interface to peripheral devices. The interconnect 45 may be point-to-point or connected to multiple devices. For clarity, not all the interconnects are shown. It is contemplated that the interconnect 45 may include any interconnect or bus such as Peripheral Component Interconnect (PCI), PCI Express, Universal Serial Bus (USB), and Direct Media Interface (DMI), etc.

The mass storage device 50 stores archive information such as code, programs, files, data, and applications. The mass storage device 50 may include compact disk (CD) read-only memory (ROM) 52, digital video/versatile disc (DVD) 53, floppy drive 54, and hard drive 56, and any other magnetic or optic storage devices. The mass storage device 50 provides a mechanism to read machine-accessible media. The I/O devices $47_1$ to $47_K$ may include any I/O devices to perform I/O functions. Examples of I/O devices $47_1$ to $47_K$ include controller for input devices (e.g., keyboard, mouse, trackball, pointing device), media card (e.g., audio, video, graphics), network card, and any other peripheral controllers.

Figure 1B:
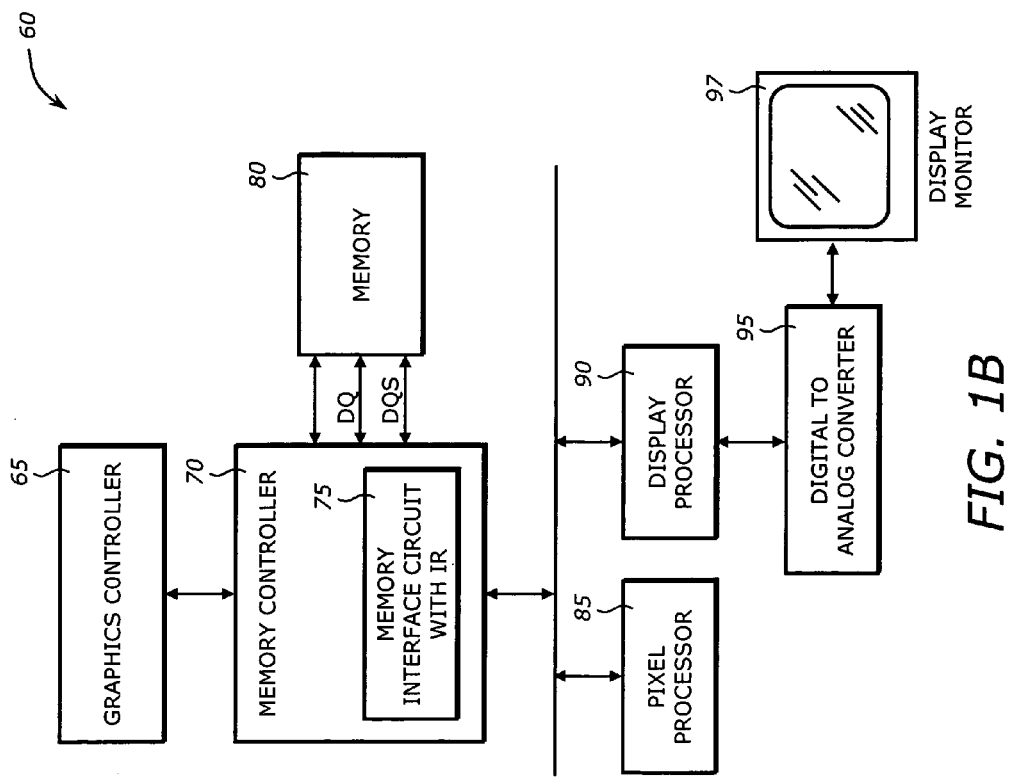
FIG. 1B is a diagram illustrating a graphics system in which one embodiment of the invention can be practiced.

FIG. 1B is a diagram illustrating a graphics system 60 in which one embodiment of the invention can be practiced. The graphics system 60 includes a graphics controller 65, a memory controller 70, a memory 80, a pixel processor 85, a display processor 90, a digital-to-analog converter (DAC) 95, and a display monitor 97.

The graphics controller 60 is any processor that has graphic capabilities to perform graphics operations such as fast line drawing, two-dimensional (2-D) and three-dimensional (3-D) graphic rendering functions, shading, anti-aliasing, polygon rendering, transparency effect, color space conversion, alpha-blending, chroma-keying, etc. The memory controller 70 performs memory control functions and includes a memory interface circuit 75 with integrating receivers. The memory 80 includes memory devices (e.g., DDR SDRAM) that use a source synchronous protocol. The memory devices store graphic data processed by the graphic controller 60.

The pixel processor 85 is a specialized graphic engine that can perform specific and complex graphic functions such as geometry calculations, affine conversions, model view projections, 3-D clipping, etc. The pixel processor 85 is also interfaced to the memory controller 70 to access the memory 80 and/or the graphic controller 65. The display processor 90 processes displaying the graphic data and performs display-related functions such as palette table look-up, synchronization, backlight controller, video processing, etc. The DAC 95 converts digital display digital data to analog video signal to the display monitor 97. The display monitor 97 is any display monitor that displays the graphic information on the screen for viewing. The display monitor may be a Cathode Ray Tube (CRT) monitor, a television (TV) set, a Liquid Crystal Display (LCD), a Flat Panel, or a Digital CRT.

Figure 1C:
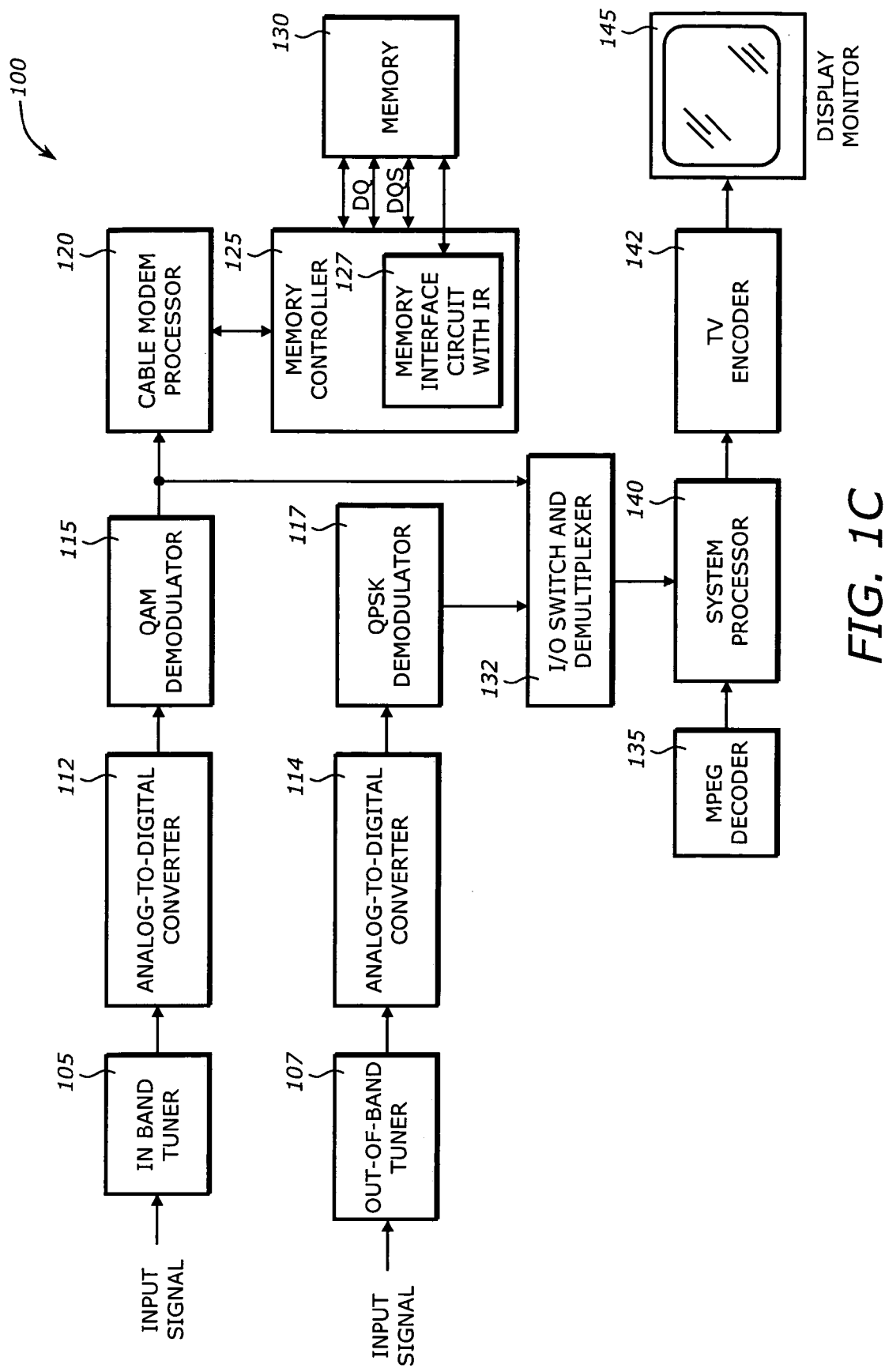
FIG. 1C is a diagram illustrating a set-top box in which one embodiment of the invention can be practiced.

FIG. 1C is a diagram illustrating a set-top box 100 in which one embodiment of the invention can be practiced. The set-top box 100 includes an in-band (IB) tuner 105, an out-of-band (OOB) tuner 107, analog-to-digital converters (ADCs) 112 and 114, a quadrature amplitude modulation (QAM) demodulator 115, a quadrature or quaternary phase shift keying (QPSK) demodulator, a cable modem processor 120, a memory controller 125, a memory 130, an I/O switch and demultiplexer 132, a Moving Picture Expert Group (MPEG) decoder 135, a system processor 140, a television (TV) encoder 142, and a TV monitor 145.

The in-band tuner 105 receives a 36-44 MHz carrier frequency signal. The ADC 112 converts the analog signal to digital data. The QAM demodulator 115 includes a mixer and multi-rate filters to convert the over-sampled intermediate frequency (IF) data stream to a base-band complex data stream. The cable modem processor 120 processes the base-band complex signal and supports Data Over Cable Service Interface Specification (DOCSIS) and other cable modem standards. The OOB tuner 107 receives signal in the 70-100 MHz frequency range. The ADC 114 converts OOB received signal to digital data. The QPSK demodulator demodulates the digital data stream to a base-band signal. The I/O switch and de-multiplexer 132 provides transport of data stream to the system processor 140. The system processor 140 processes the data stream and performs other system functions such as navigation/user interface, advanced electronic program guides and other interactive TV applications. The TV encoder 142 encodes the data stream into video signal to be displayed on the TV monitor 145. The memory controller 125 provides interface to the memory 130. The memory controller 125 includes a memory interface circuit 127 using integrating receivers for enhanced and reliable memory accesses. The memory 130 may contain any types of memory devices (e.g., SDRAMs) that support the source synchronous protocol. The MPEG decoder 135 decodes the video data stream in MPEG format.

Embodiments of the invention may be used in a memory controller or any other interfacing circuit that has a receiver data path. The use of the memory controller described herein is for illustrative purposes only. Other interfacing circuits in data transfers, embedded processors, read/write circuits, interconnect interface, bus interface, etc. may use the integrating receiver circuit.

Figure 2:
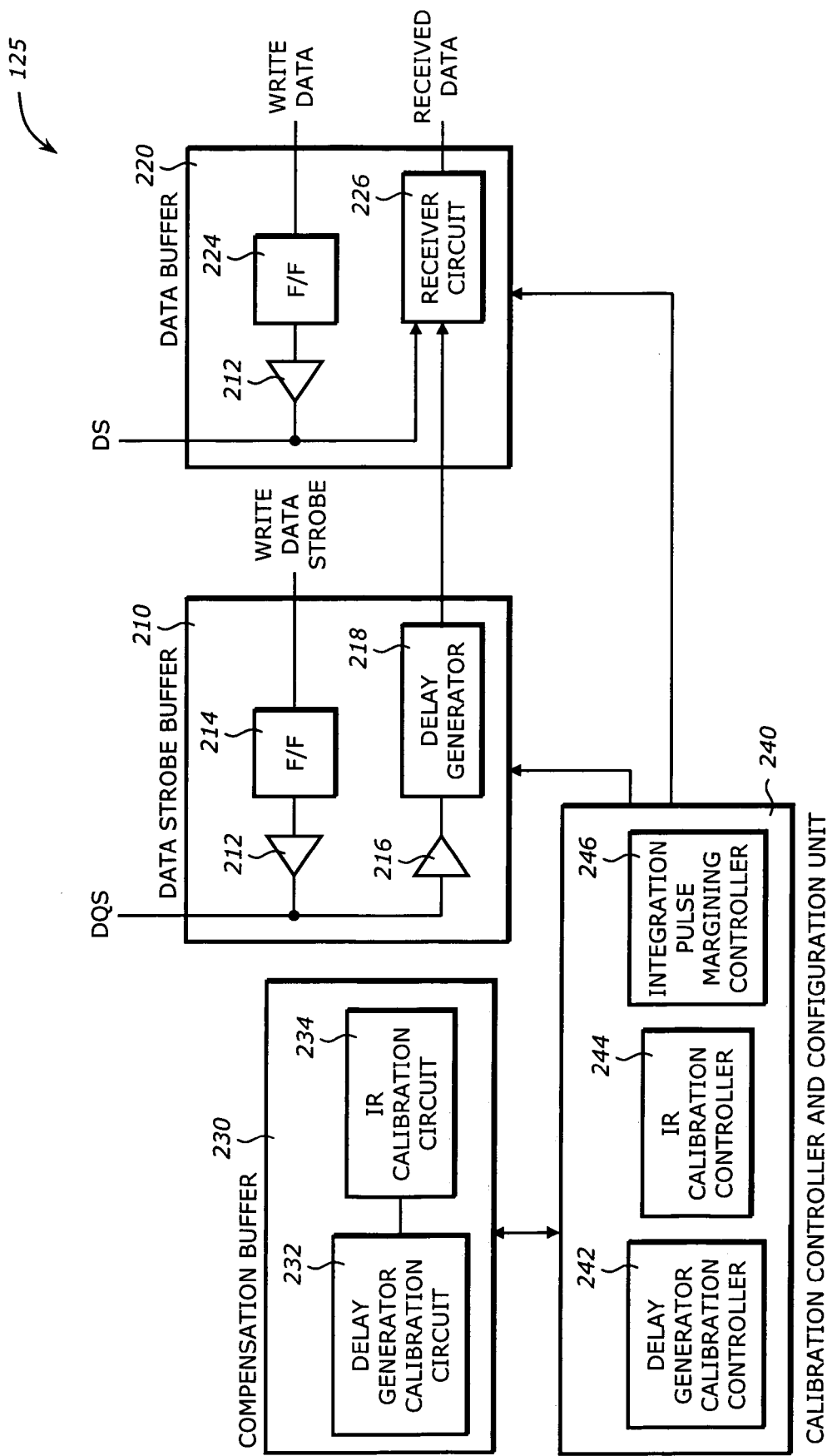
FIG. 2 is a diagram illustrating a memory interface circuit according to one embodiment of the invention.

FIG. 2 is a diagram illustrating a memory interface circuit 25/75/127 according to one embodiment of the invention. The memory interface circuit 25/75/127 includes a data strobe buffer 210, a data buffer 220, a compensation buffer 230, and a calibration controller and configuration unit 240.

The data strobe buffer 210 is a circuit to generate the data strobe (DQS) in a write operation and receive the DQS in a read operation. The data strobe buffer 210 includes a driver 212, an output flip-flop 214, an input receiver 216, and a delay generator 218. The driver 212 buffers the write data strobe from the output flip-flop 214. The output flip-flop 214 latches the data strobe generated from a write circuit during a write cycle. The input receiver 216 buffers the incoming DQS. The delay generator 218 generates delayed strobe signals that are used by the receiver circuit 226 to integrate the data.

The data buffer 220 is a circuit to generate the data (DQ) in a write operation and receive the DQ in a read operation. Typically, the DQ is synchronized with the DQS. The DQ and the DQS are provided according to a source synchronous protocol. The source synchronous protocol is a protocol where the data and the data strobe from the source are synchronized or are related by a well defined timing relationship. For example, during the write cycle, the DQS may be positioned in the middle of the window over which the data is valid. During the read cycle, the DQS may be positioned or edge aligned at the beginning of the data valid window. The data buffer 220 includes a driver 222, a data output flip-flop 224, and a receiver circuit 226. The driver 222 buffers the data provided by the data output flip-flop 224. The data output flip-flop latches the data as provided by a write circuit. The receiver circuit 226 receives the data DQ and generates the data DQ reliably by integrating the data over an integration window that has been calibrated to compensate for Process, Voltage, Temperature (PVT) variations and any other noise or skew sources.

The compensation buffer 230 provides various compensation functionalities. It includes a delay calibration circuit 232 and an IR calibration circuit 234. The delay calibration circuit 232 performs at least two calibration functions. The first function is to calibrate an adjusting code of the delay elements used in the delay generator 218. The second function is to aid in the calibration process of the IR calibration circuit to determine an optimum integration window defined by first and second integrating strobes. This provides proper timing margin for the discharge of data within integration window. The IR calibration circuit 234 also has at least two functions. The first function is to determine the discharge code that affects the discharge rate of the receiver circuit 226. The second function is to work in conjunction with the delay calibration circuit 232 to determine the appropriate timing margins for positions for the first and second integrating strobes. The calibration functions of the delay generator calibration circuit 232 and the IR calibration circuit 234 are to compensate for variations in PVT for the individual memory interface circuit 125.

The calibration controller and configuration unit 240 contains state machines that control the calibration and margining processes of the delay generator calibration circuit 232 and the IR calibration circuit 234. It sends the calibrated adjusting code to the delay generator 218 and the calibrated discharge code to the receiver circuit 226. It includes a delay generator calibration controller 242 to control the delay generator calibration circuit 232, an IR calibration controller 244 to control the IR calibration circuit 234, and an integration pulse margining controller 246 to control calibrating or margining the integration pulse used in the receiver circuit 226.

Figure 3:
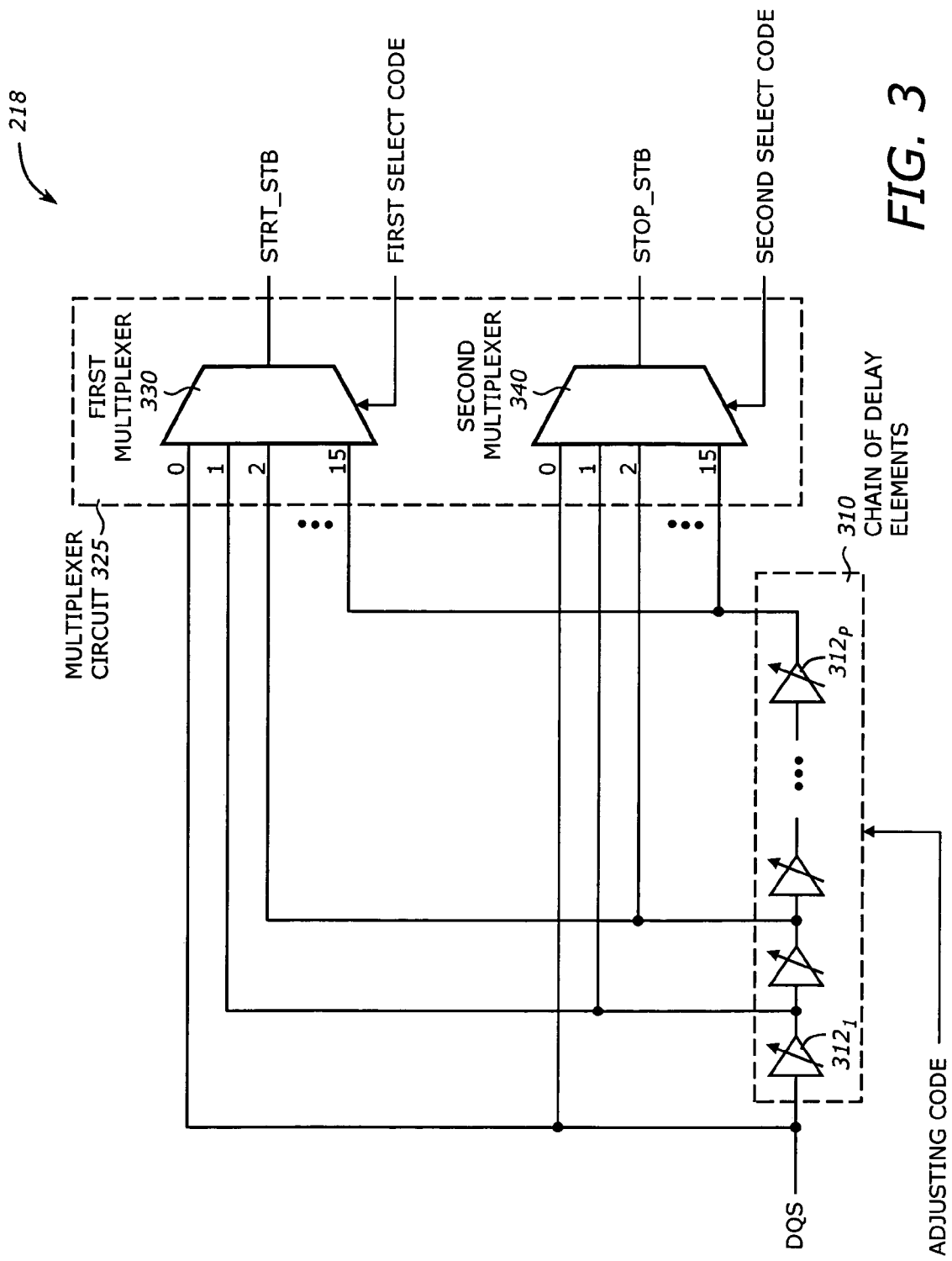
FIG. 3 is a diagram illustrating a delay generator according to one embodiment of the invention.

FIG. 3 is a diagram illustrating a delay generator 218 according to one embodiment of the invention. The delay generator 218 includes a chain of delay elements 310 and a multiplexer circuit 325.

The chain of delay elements 310 include P delay elements connected in series, one after another to form P taps. P is a positive integer. The input to the chain 310 is the data strobe (DQS). Each tap provides a cumulative delay from previous taps. Typically, the P delay elements are identical with the same delay time. The delay time is selected to be very small compared to the data valid time. In one embodiment, the delay time of each delay element ranges from about 25 picoseconds (psec) to 150 psec. In one embodiment, the number P of the delay elements is 15. The delay elements are controlled or adjusted by an adjusting code to control the variable delays of the delay elements. The adjusting code may correspond to the strength of the delay elements and may include multiple levels of adjustments such as coarse and fine modes. The adjusting code is provided by the calibration controller configuration unit 240 after the calibration process or the delay generator is completed.

The multiplexer circuit 325 generates at least an integrating strobe used to define an integrating window. The multiplexer circuit 325 may generate a single integrating strobe, two integrating strobes, four integrating strobes, or any number of integrating strobes depending on the strobing mode or configuration using a select code. For a double-pumped mode, two integrating strobes may be generated. In the embodiment shown in FIG. 3, the multiplexer circuit 325 includes a first multiplexer 330 and a second multiplexer 340.

The first multiplexer 330 is a P-to-1 multiplexer to generate a first integrating strobe or a start strobe (STRT_STB) as selected by a first select code or a start select code. P is a positive integer. The P inputs to the first multiplexer 330 are taken from the P taps of the chain of the P delay elements 310. The value of the first select code corresponds to the number of delay times. For example, if there are 15 delay elements, each having a delay time of D time units, then a first select code of, say, 9 (1001 in binary) provides a STRT_STB which is the DQS delayed by 9*D time units. Similarly, the second multiplexer 340 is a P-to-1 multiplexer to generate a second integrating strobe or a stop strobe (STOP_STB) as selected by a second select code. The P inputs to the second multiplexer 340 are also taken from the P taps of the chain of the P delay elements. The value of the second select code corresponds to the number of delay times. The STOP_STB may never be earlier than the STRT_STB. In other words, the second select code is equal to or greater than the first select code. The first and second select codes are provided by the calibration controller configuration unit 240 after the calibration and the margining of the delay generator calibration circuit 232 and the IR calibration circuit 234 are completed.

Figure 4:
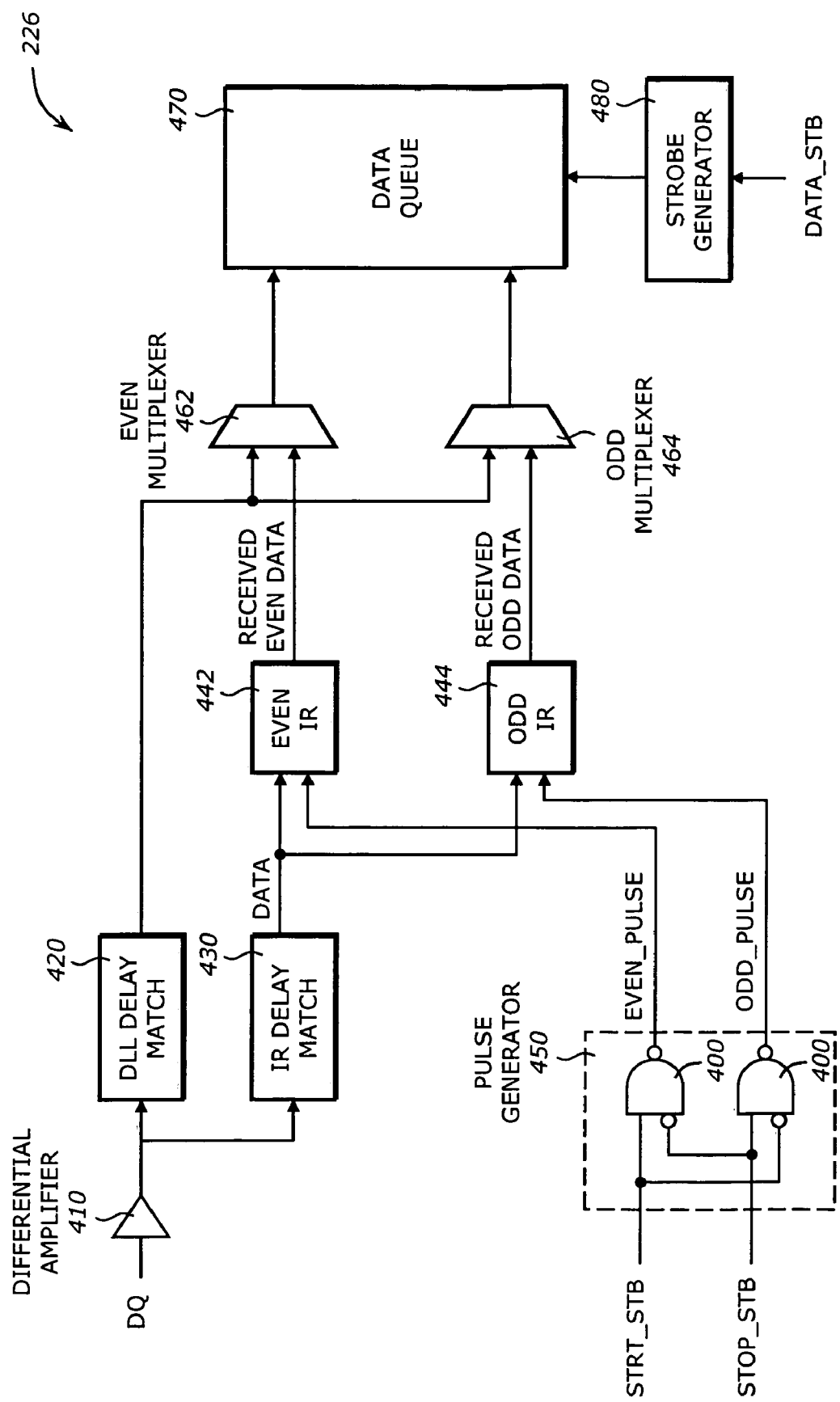
FIG. 4 is a diagram illustrating a receiver circuit according to one embodiment of the invention.

FIG. 4 is a diagram illustrating a receiver circuit 226 according to one embodiment of the invention. The receiver circuit 226 includes a differential amplifier 410, a delay locked loop (DLL) delay match circuit 420, an IR delay match circuit 430, an even IR 442, an odd IR 444, a pulse generator 450, an even multiplexer 462, an odd multiplexer 464, a data queue 470, and a strobe generator 480.

The differential amplifier 410 provides differential data inputs from the DQ. The DLL matching circuit 420 provides a delay that matches the cumulative delay caused by the DQS DLL strobe path. The IR delay match circuit 430 provides a delay to the data to match cumulative effects of the pulse generator 450, the delay generator 218, and any other timing-affecting elements.

The even IR 442 integrates the even data in the data sequence over the integration window as provided by an even pulse (EVEN_PULSE) from the pulse generator 450. The odd IR 444 integrates the odd data in the data sequence over the integration window as provided by an odd pulse (ODD_PULSE) from the pulse generator 450. The even and odd IRs 442 and 444 are identical and perform alternating functions. When the even IR 442 is pre-charging, the odd IR 444 is sensing and integrating the data. When the odd IR 444 is pre-charging, the even IR 442 is sensing and integrating the data. The data therefore are integrated over the entire data window for each data in the sequence. The use of the even and odd IR's 442 and 444 is to illustrate a double-pumped mode. As discussed above, other strobing modes, such as single-pumped or quad-pumped, may be employed. In such cases, there may be a single IR or more than two IR's.

The pulse generator 450 generates the even pulse and the odd pulse from the first and second integrating strobes. It essentially includes a logic circuit or gate to combine the first and second integrating strobes. As discussed above, the pulse generator 450 may also generate only a single pulse or more than two pulse signals to accommodate other strobing modes. For the double-pumped mode as illustrated here, the logic equations for the EVEN_PULSE and the ODD_PULSE are:

EVEN_PULSE=NOT (STRT_STB AND NOT (STOP_STB))

ODD_PULSE=NOT (STOP_STB AND NOT (STRT_STB))

The even multiplexer 462 provides the data selected from the output of the DLL delay match circuit 420 and the received even data from the output of the even IR 442. The odd multiplexer 464 provides the data selected from the output of the DLL delay match circuit 420 and the received odd data from the output of the odd IR 444. The outputs of the even and odd multiplexers 462 and 464 are fed to the data queue 470. The data queue 470 latches the data in a suitable ordering sequence, e.g., first in first out, by the strobe generator 480 to transmit the received data to the core.

Figure 5:
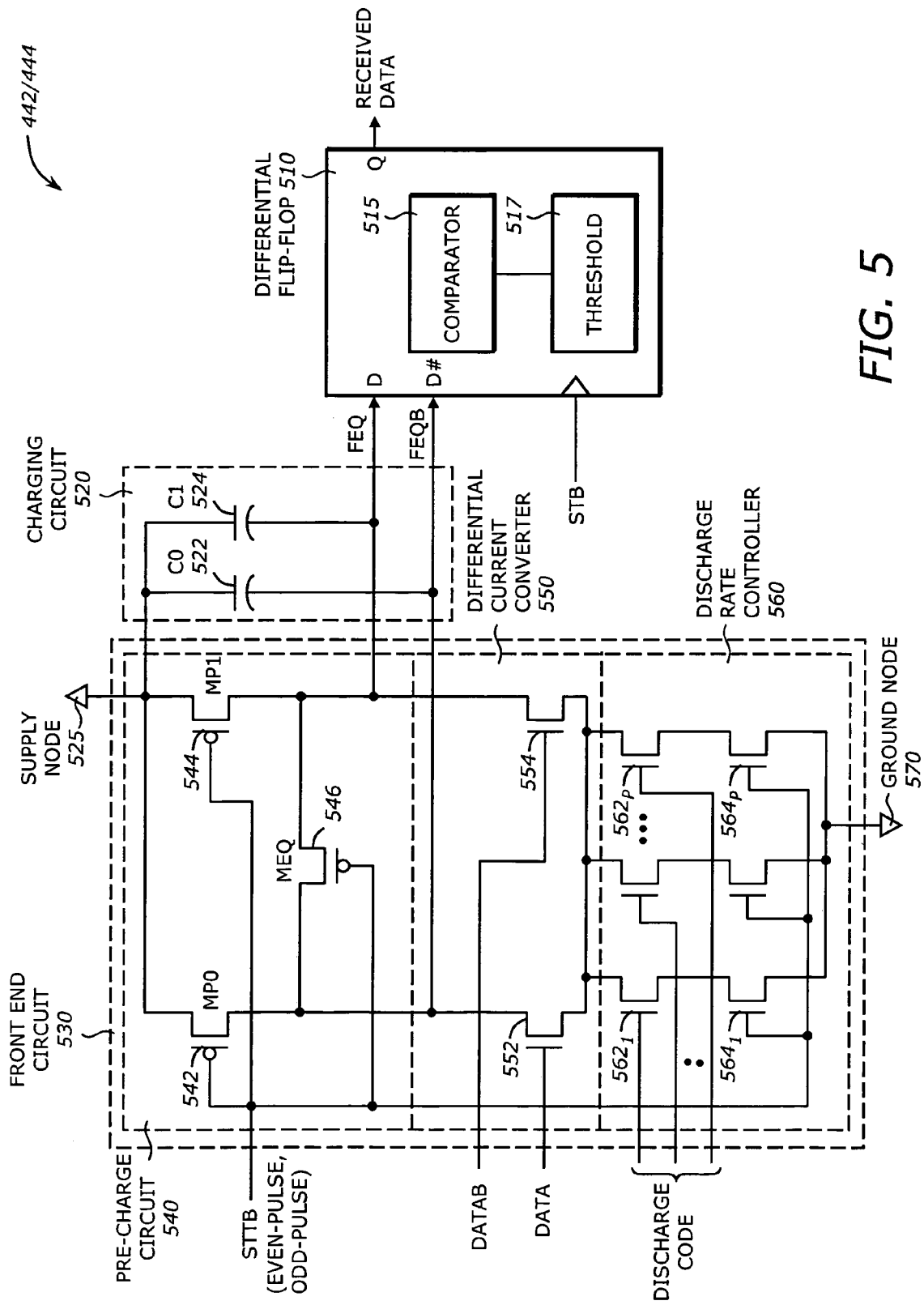
FIG. 5 is a diagram illustrating an integrating receiver according to one embodiment of the invention.

FIG. 5 is a diagram illustrating an integrating receiver (IR) 442/444 according to one embodiment of the invention. The IR 442/444 includes a differential flip-flop 510, a charging circuit 520, and a front-end circuit 530. The inputs to the IR include the integration pulse (which is the EVEN_PULSE or ODD_PULSE corresponding to even or odd IR, respectively), the data, and the discharge code. The integration pulse is referred to as the STBB signal. Its complement is the STB signal.

The differential flip flop 510 has two differential sense inputs FEQ and FEQB to generate a received data corresponding to the data DQ at a first edge STB of the integration pulse (even or odd pulse depending on whether the IR is even or odd IR). The first edge STB indicates the end of the integration period. It is the trailing edge of the integration pulse. The differential sense inputs are pre-charged to a supply level when the integration pulse is at a first logic level (e.g., LOW). The differential flip flop 510 includes a comparator 515 to generate a comparison result by comparing a difference of the differential sense inputs with a threshold 517. The comparator 515 provides the received data based on the comparison result. For example, if the comparison result indicates that the difference of the differential sense inputs is higher than the threshold 517, then the differential flip-flop 510 generates a logical HIGH received data; otherwise, it generates a logical LOW received data.

The charging circuit 520 discharges the pre-charged differential sense inputs when the integration pulse is at a second logic level (e.g., HIGH). In one embodiment, the charging circuit 520 includes two capacitors C0 522 and C1 524 that are substantially identical and are connected between the differential sense inputs and a supply node 525.

The front-end circuit 530 pre-charges the differential sense inputs when the pulse is at a first logic level (e.g., LOW) and controls discharging the differential sense inputs when the integration pulse is at the second logic level (e.g., HIGH). The front-end circuit 530 includes a pre-charge circuit 540, a differential current converter 550, and a programmable discharge rate controller 560. The pre-charge circuit 540 drives the differential sense inputs to the supply level when the integration pulse is at the first logic level (e.g., LOW). The differential current converter 550 converts the data (DATA) and a complement of the data (DATAB) to differential currents at the differential sense inputs. The programmable discharge rate controller 560 provides a programmable discharge rate to the charging circuit 520. It includes P transistors $562_1$ to $562_P$ connected in parallel to provide on-resistance values corresponding to the programmable discharge rate when a discharge code is applied; and P transistors $564_1$ to $564_P$ connected in series with the P transistors $562_1$ to $562_P$ to a ground node 570. The P transistors $564_1$ to $564_P$ are turned on to the ground node 570 when the pulse is at the second logic level (e.g., HIGH).

The pre-charging circuit 540 includes three transistors MP0 542, MP1 544, and MEQ 546. When the STBB is LOW, transistors MP0 542, MP1 544, and MEQ 546 are turned on, and the transistors $564_1$ to $564_P$ are turned off. The result is that the two capacitors C0 522 and C1 524 are pre-charged to a logic HIGH level as defined by the supply node 525. The MEQ 546 equalizes the pre-charge rates of the two capacitors C0 522 and C1 524 and the voltage levels. When the STBB is HIGH, transistors MP0 542, MP1 544, and MEQ are turned off, and the transistors $564_1$ to $564_P$ are turned on. The transistors 552 and 554 in the differential current converter 550 convert the pseudo differential DATA and DATAB to differential currents to the differential sense inputs FEQ and FEQB to the flip-flop 510. The two capacitors C0 522 and C1 524 discharges to a voltage level according to the DATA and DATAB. The discharge rate is proportional to the time constant RC where C is the equivalent capacitance of the two capacitors C0 522 and C1 524 and R is the total resistance provided by the P transistors $562_1$ to $562_P$ and $564_1$ to $564_P$.

Figure 6A:
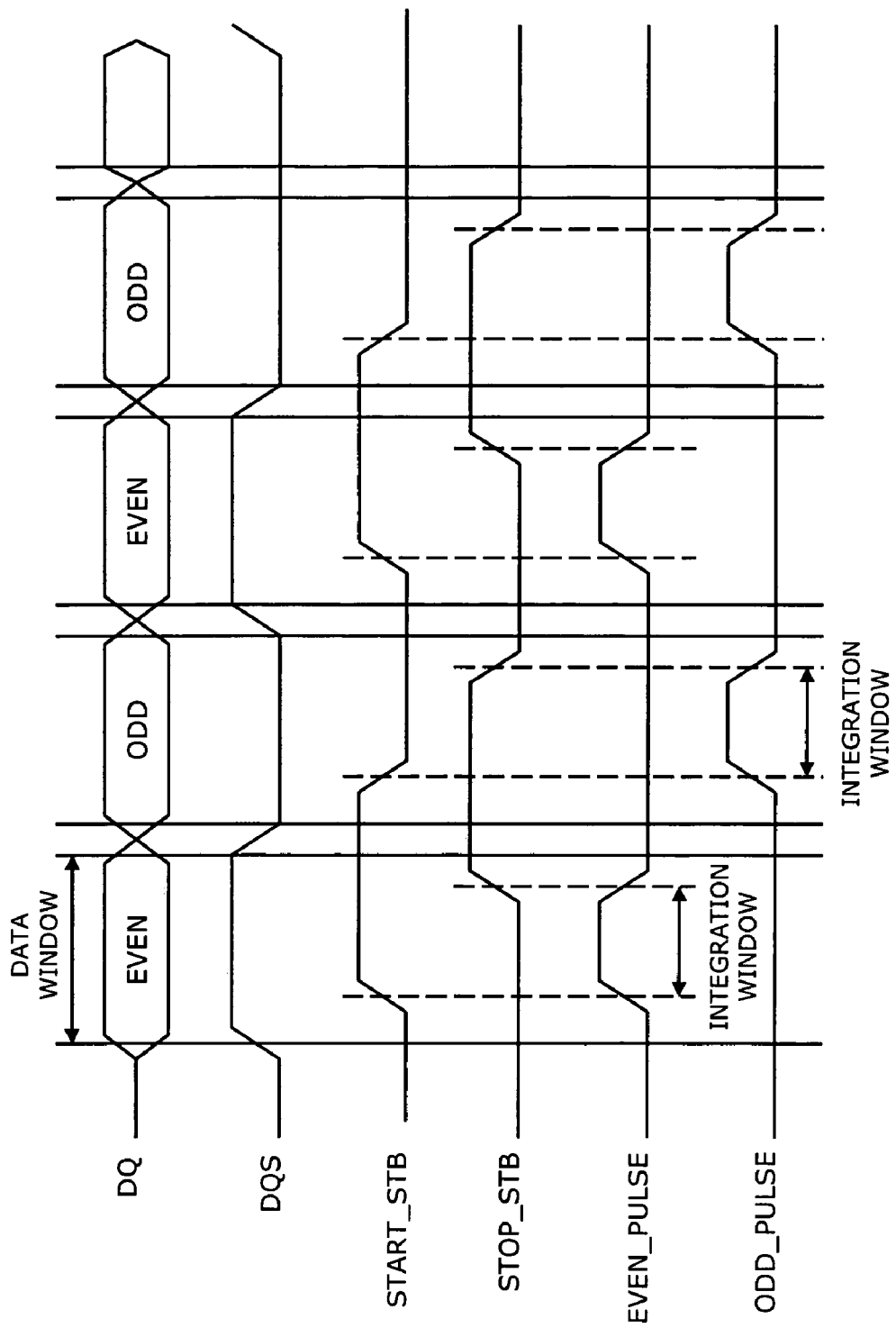
FIG. 6A is a timing diagram illustrating timing relationships of the signals in the integration receiver in a double-pumped mode according to one embodiment of the invention.

FIG. 6A is a timing diagram illustrating timing relationships of the signals in the integration receiver in a double-pumped mode according to one embodiment of the invention. The data DQ shows a sequence of data alternating between even data and odd data. The even and odd data are consecutive and alternating. The DQ is valid within a data window. The data window is typically not ideal due to noise and other timing skew problems. To reliably detect the data, it is preferably to integrate the data over an integration window. The integration window is positioned within the data window and preferably aligned to the data valid window.

The data strobe DQS is synchronized with the DQ. The leading edge of the DQS is aligned with the starting point of the data window. The trailing edge of the DQS is aligned with the ending point of the data window. The STRT_STB is a delayed version of the DQS. It is delayed by the delay generator 218 (FIG. 2). The amount of the delay is precisely provided through the calibration procedure that compensates for any PVT variations. The STOP_STR is another delayed version of the DQS. It is also delayed by the delay generator 218 with a longer delay than the delay for the STRT_STB. The difference between the two delays defines the pulse width of the integration pulse (EVEN_PULSE or ODD_PULSE) which corresponds to the integration window.

The EVEN_PULSE is generated by combining the STRT_STB and the STOP_STB such that the resulting pulse is positioned within the data window of the even data. Similarly, the ODD_PULSE is generated by combining the STRT_STB and the STOP_STB such that the resulting pulse is positioned within the data window of the odd data.

Figure 6B:
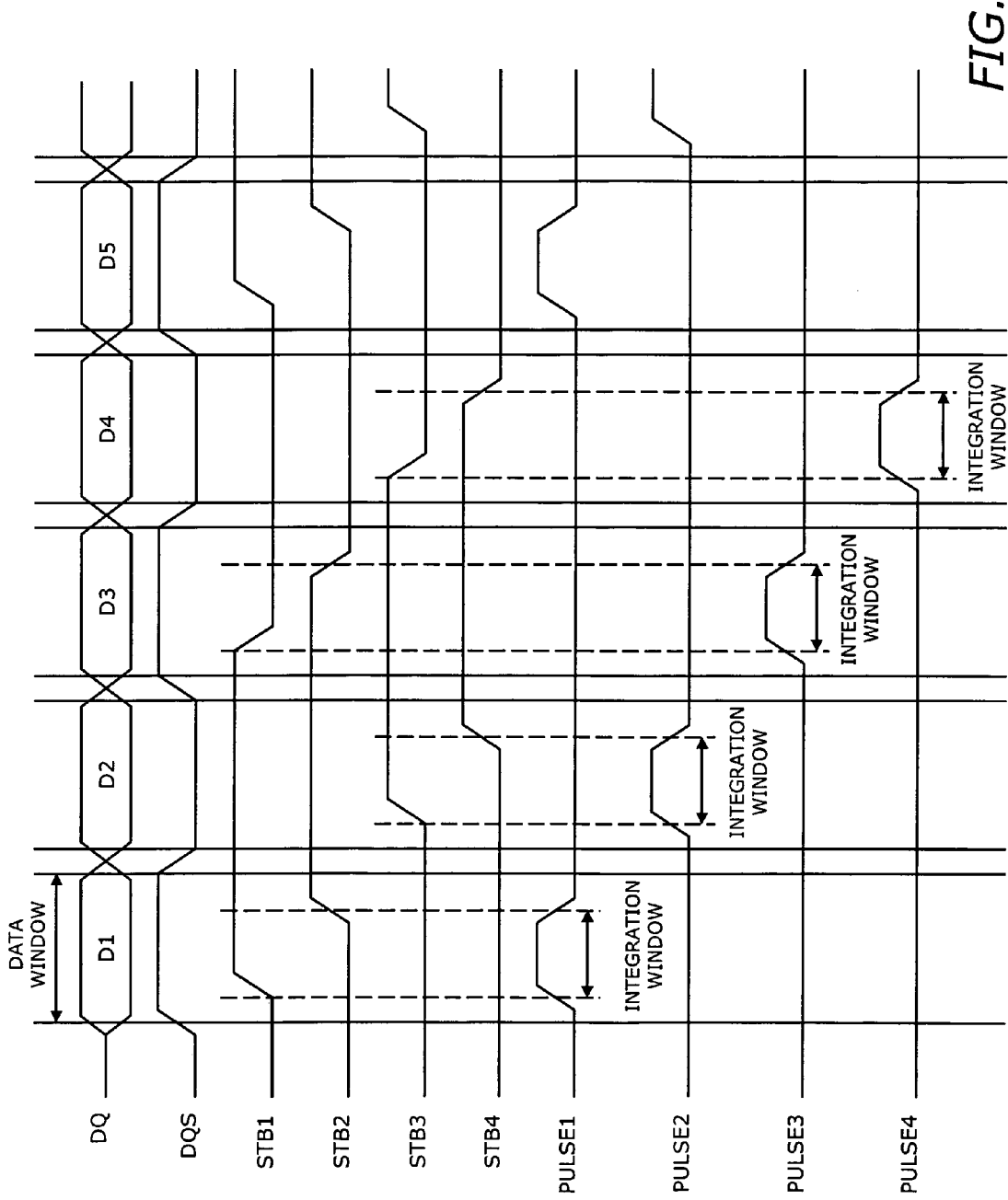
FIG. 6B is a timing diagram illustrating timing relationships of the signals in the integration receiver in a quad-pumped mode according to one embodiment of the invention.

FIG. 6B is a timing diagram illustrating the timing relationships of the signals in the integrating receiver in a quad-pumped mode according to one embodiment of the inventions. The data DQ shows a sequence of data. The DQS is aligned with the data DQ. There are four integrating strobes STB1, STB2, STB3 and STB4 and four integrating windows defined by four pulses PULSE1, PULSE2, PULSE3, and PULSE4.

In one embodiment, the PULSE1 and PULSE4 are generated from the STB1 and STB2. The PULSE2 and PULSE4 are generated from the STB3 and STB4. The STB1, STB2, STB3, and STB4 are delayed from the DQS or its variations (e.g., divide-by-2, complement) by the delay generator 218 (FIG. 2).

The leading edges of STB1 and STB2 are delayed from the first leading edge of the DQS by two amounts whose difference defines the pulse width of PULSE1. The leading edges of STB3 and STB4 are delayed from the first trailing edge of the DQS by two amounts whose difference defines the pulse width of PULSE2. Similarly, the trailing edges of STB1 and STB2 are delayed from the second leading edge of the DQS by two amounts whose difference defines the pulse width of PULSE3. The trailing edges of STB3 and STB4 are delayed from the second trailing edge of the DQS by two amounts whose difference defines the pulse width of PULSE4.

Figure 7:
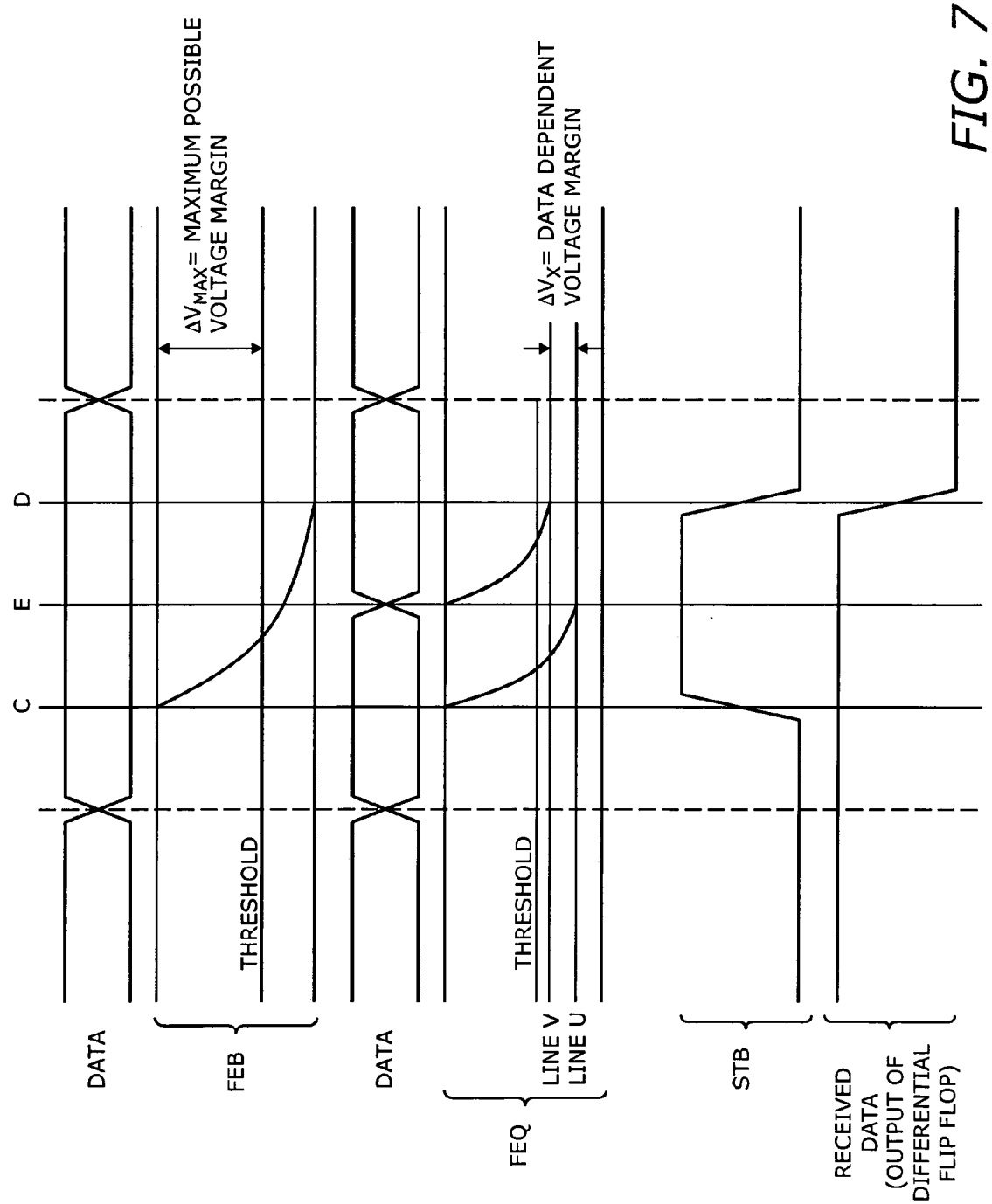
FIG. 7 is a timing diagram illustrating the discharge of the differential sense inputs in the integration receiver according to one embodiment of the invention.

FIG. 7 is a timing diagram illustrating the discharge of the differential sense inputs in the integration receiver according to one embodiment of the invention. The timing diagram shows two scenarios for the data switching behavior of DQ. In the first scenario, the DQ A switches at the beginning of the data window and stays stable throughout the data window. The STBB, (EVEN_PUSLE or ODD_PULSE) is positioned within the data window and defines the integration period. Line C indicates the start of the integration and line D indicates the end of the integration. The FEB sense input is pre-charged to Vcc before and at line C. Then, as STBB goes HIGH, the FEB sense input begins to discharge to Vss (ground level). The discharge rate is such that FEB crosses below the threshold in the differential flip-flop well before line D, and eventually reaches Vss at the end of the integration period. The difference $\Delta_{max}$ between the threshold level and the Vcc level represents the maximum possible voltage margin. In the second scenario, the DQ B switches around in the middle of the integration period. Line E indicates the time at which the data switches. The FEQ is pre-charged to Vcc before and at line C and begins to discharge after line C as in the first scenario. However, at line E, the data changes state, forcing the FEQ to charge up, while the previous discharge curve reaches the level indicated by the horizontal line U. The new discharge curve continues to discharge from line E toward Vss. At the end of the integration period, this curve crosses the threshold and reaches the level indicated by the horizontal line V. The difference $\Delta_x$ between U and V indicates the data-dependent voltage margin. The received data shows the output of the differential flip-flop that corresponds to the received data as latched at the trailing edge of the STBB or the leading edge of its complement, STB.

Figure 8A:
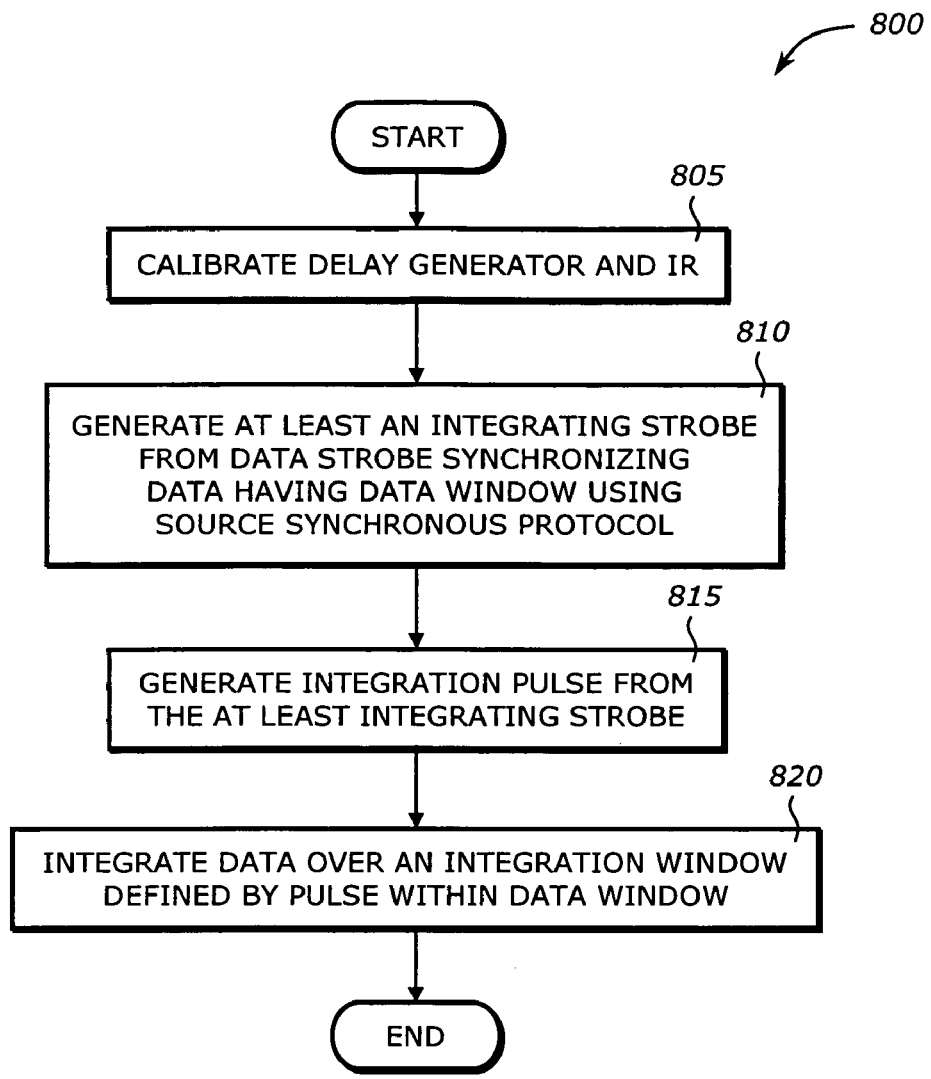
FIG. 8A is a flowchart illustrating a process to integrate data using the integrating receivers according to one embodiment of the invention.

FIG. 8A is a flowchart illustrating a process 800 to integrate data using the integrating receivers according to one embodiment of the invention. Upon START, the process 800 calibrates the delay generator and the integrating receivers (Block 805). The calibration procedure includes determining the proper setting for the adjusting code in the delay generator, the discharge code for the IR, and the positioning of the pulse (EVEN_PULSE or ODD_PULSE) corresponding to the integration period. Then, the process 800 generates the first and second integrating strobes from the data strobe synchronizing the data having a data window in a data sequence using a source synchronous protocol (Block 810).

Then, the process 800 generates the integration pulse (EVEN_PUSLE or ODD_PULSE) from the first and second integrating strobes (Block 815). Next, the process 800 integrates the data over an integration period defined by the pulse within the data window (Block 820). The process 800 is then terminated.

Figure 8B:
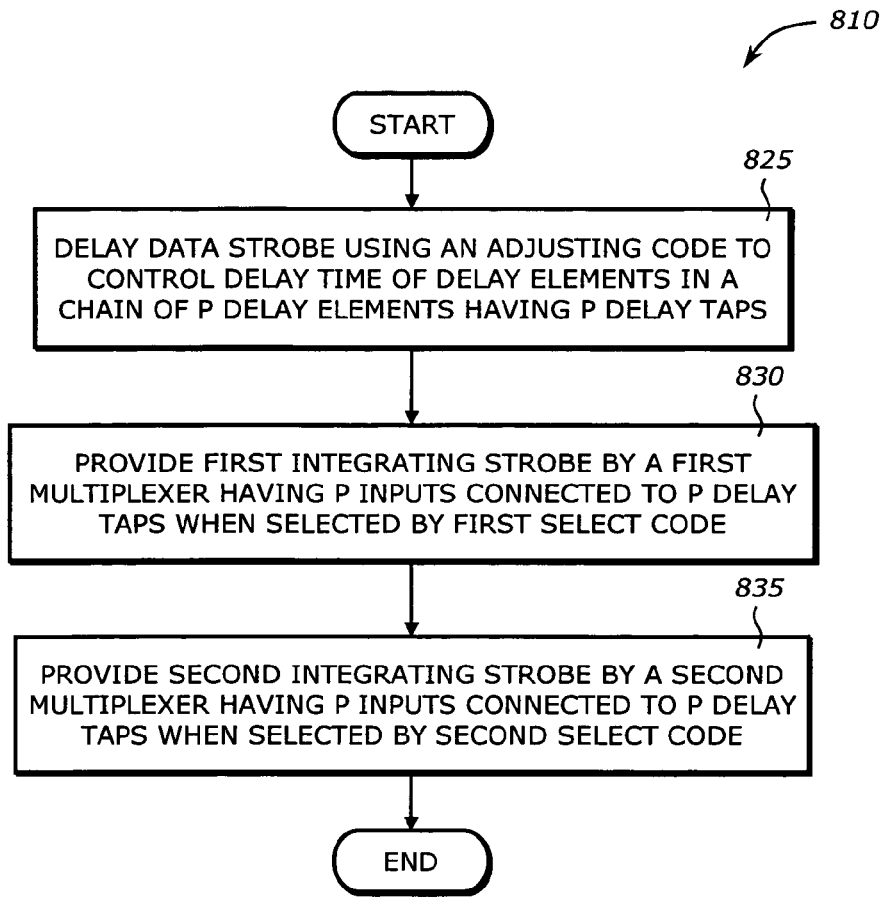
FIG. 8B is a flowchart illustrating a process to generate the first and second integrating strobes according to one embodiment of the invention.

FIG. 8B is a flowchart illustrating a process 810 to generate the first and second integrating strobes according to one embodiment of the invention. Upon START, the process 810 delays the data strobe using an adjusting code to control delay time of P delay elements in a chain of P delay elements having P delay taps (Block 825). Next, the process 810 provides the first integrating strobe by a first multiplexer having P inputs connected to the P delay taps when selected by a first select code (Block 830). Then, the process 810 provides the second integrating strobe by a second multiplexer having P inputs connected to the P delay taps when selected by a stop select code (Block 835). The process 810 is then terminated.

Figure 8C:
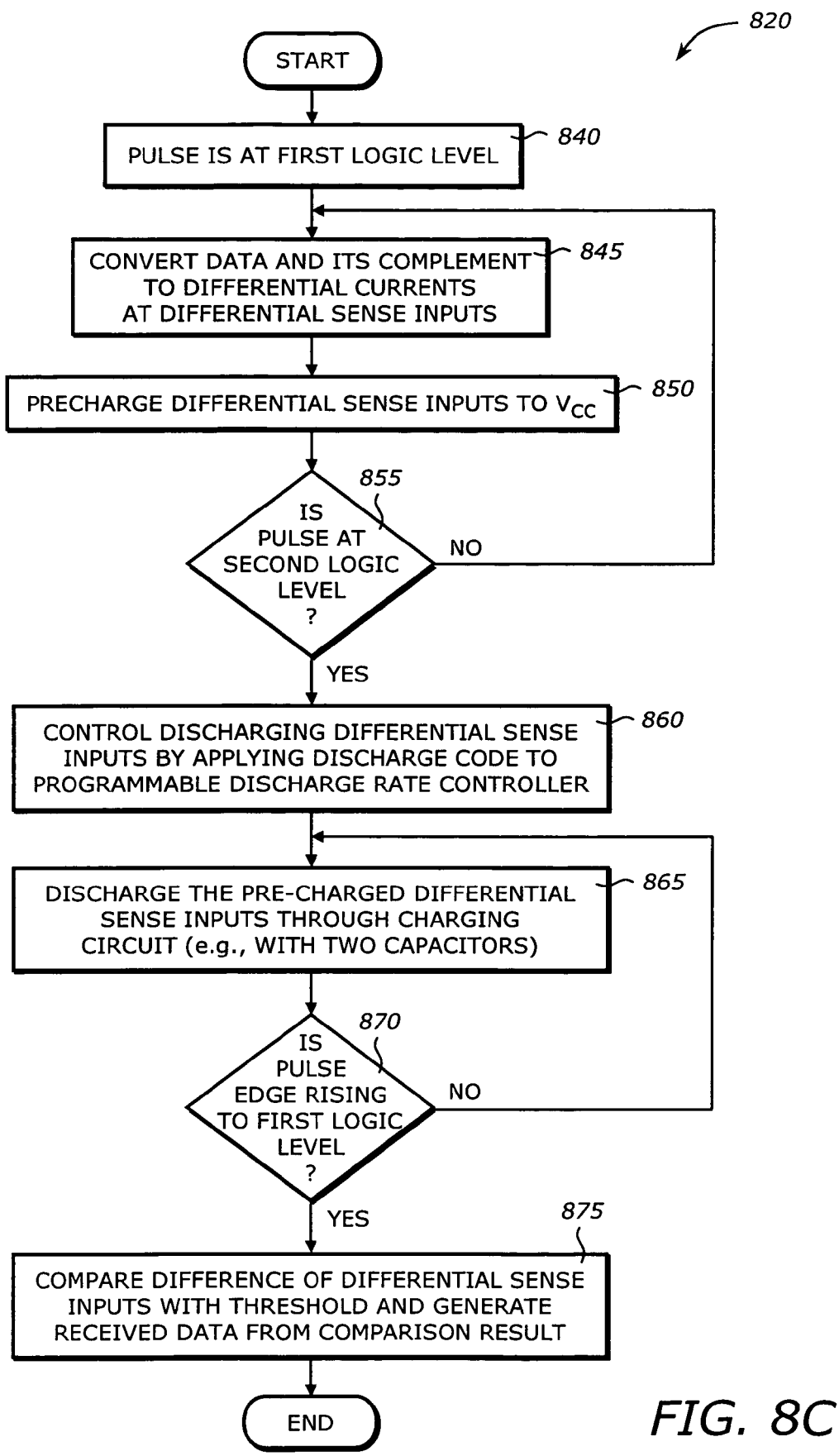
FIG. 8C is a flowchart illustrating a process to integrate data according to one embodiment of the invention.

FIG. 8C is a flowchart illustrating a process 820 to integrate data according to one embodiment of the invention. Upon START, the process 820 sets the pulse at a first logic level (e.g., LOW) (Block 840). Next, the process 820 converts the data and its complement to differential currents at the differential sense inputs to a differential flip-flop (Block 845). Then, the process 820 pre-charges the differential inputs to Vcc through a charging circuit (Block 850). The charging circuit may include two substantially identical capacitors.

Next, the process 820 determines if the pulse is at the second logic level (e.g., HIGH). If not, the process 830 returns to Block 850 to continue pre-charging the differential sense inputs. Otherwise, the process 830 controls discharging the differential sense inputs by applying a discharge code to a programmable discharge rate controller (Block 860). Then, the process 820 discharges the pre-charged differential sense inputs through the charging circuit (Block 865). Next, the process 820 determines if the pulse edge is going to the first logic level (e.g., LOW) (Block 870). If not, the process 820 returns to Block 865 to continue discharging at the rate controlled by the programmable discharge rate controller. Otherwise, the process 820 compares the difference of the differential sense inputs with a threshold inside the differential flip-flop and generates the received data based on the comparison result (Block 875). The process 820 is then terminated.

Calibration of Delay Generator and IR

Variations in PVT and other factors may affect the performance of the memory interface circuit. To ensure that on-die circuits perform reliably according to their environment, the delay generator and the IR used in the memory interface circuit 125 are calibrated prior to functional use. The calibration process may be performed at any suitable time such as during the initial power-up period or some periodical intervals.

Figure 9:
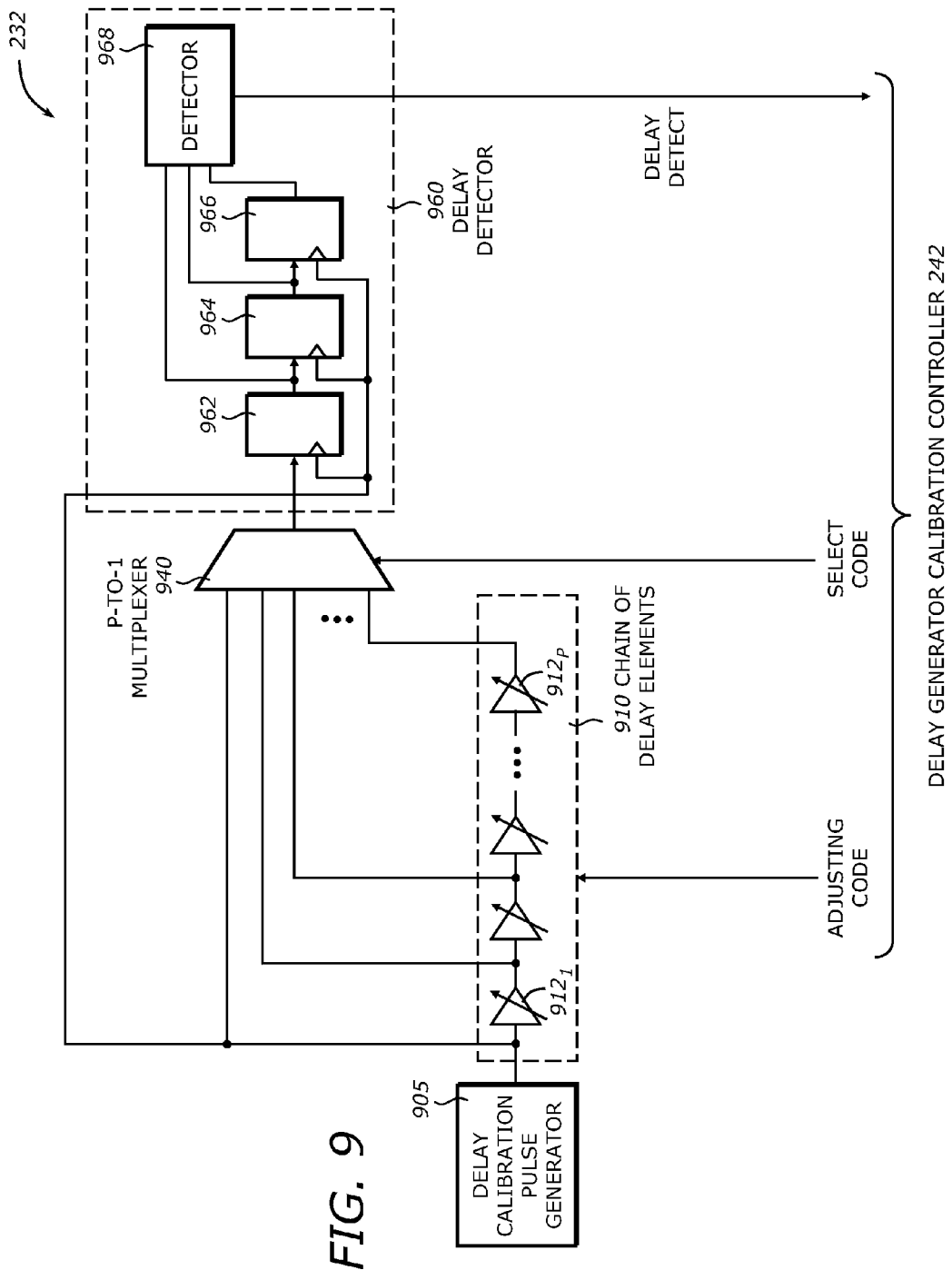
FIG. 9 is a diagram illustrating a delay generator calibration circuit according to one embodiment of the invention.

FIG. 9 is a diagram illustrating a delay generator calibration circuit 232 according to one embodiment of the invention. The delay generator calibration circuit 232 is similar to the delay generator 218 used in the data strobe buffer 210. Since the delay generator calibration circuit 232 is located close to the delay generator 218 and uses similar elements, the process variations between the two circuits are minimal. Calibrated values obtained for the delay generator calibration circuit 232, therefore, are applicable for the delay generator 218. The delay generator calibration circuit 232 includes a chain of delay elements 910, a multiplexer 940, and a delay detector 960.

The input to the delay calibration circuit 232 is a delay calibration pulse having a pre-defined period. The pre-defined period may be selected as the data window time. There may be a gating circuit to gate a clock having a clock period equal to the data window time and an enable signal. The enable signal may be provided by the calibration controller 242. The chain of delay elements 910 is similar to the chain 310 (FIG. 3) and includes P delay elements $912_1$ to $912_P$ connected in series, one after another to form P taps. The input to the chain 910 is the pulse generated by the delay calibration pulse generator 905. The delay elements are controlled or adjusted by an adjusting code to control the variable delays of the delay elements. The adjusting code provided by the delay generator calibration controller 242.

The multiplexer 940 is a P-to-1 multiplexer to generate a delayed pulse as selected by a select code. The P inputs to the multiplexer 940 are taken from the P taps of the chain of the P delay elements. The value of the select code corresponds to the number of delay times. The select code is provided by the delay generator calibration controller 242.

The delay detector 960 provides a delay detect signal to the delay generator calibration controller 242 to determine if the delayed pulse is detected. It includes three flip-flops 962, 964, and 966 connected in series and are clocked by the pulse generated by the delay calibration pulse generator 905, and a detector 968. The detector 968 is a combinational circuit to combine the outputs of the three flip-flops for a reliable detection of the delayed pulse. The detector 968 may be optional and any of the outputs of the flip-flops 962, 964, and 966 may be used as the delay detect signal.

The main purpose of the delay generator calibration circuit is to determine the adjusting code for the chain of delay elements such that the total delay time is equal to the width of the input pulse. The width of the input pulse is equal to the data valid window or the bit time of the data. For a DRAM operating at 400 MHz using a double-pumped configuration, the bit time is equal to the inverse of 2×clock frequency, or $1/800$ MHz=1.25 nsec. If the calibration is done for less than the total delay time, the calibrated delay generator can support a lager pulse. Suppose the clock frequency of the DDR DRAM is $f_c$. The data valid window has a width of $\frac{1}{2}f_c$ or 0.5*clock period. Suppose the multiplexer 940 is a 16-to-1 multiplexer and the chain of delay elements has P=15 elements. If the select code is set at the highest code, e.g., 15, then the entire delay of P delay elements is calibrated for this 0.5*clock period, or, each delay element is calibrated for (0.5*clock period)/15). If the select code is set at another lower code R<15, then R of the delay elements are calibrated for 0.5*clock period. Therefore, each delay element is calibrated for (0.5*clock period/R) and the entire delay chain of 15 elements is calibrated to (0.5*clock period)*15/R.

Figure 10:
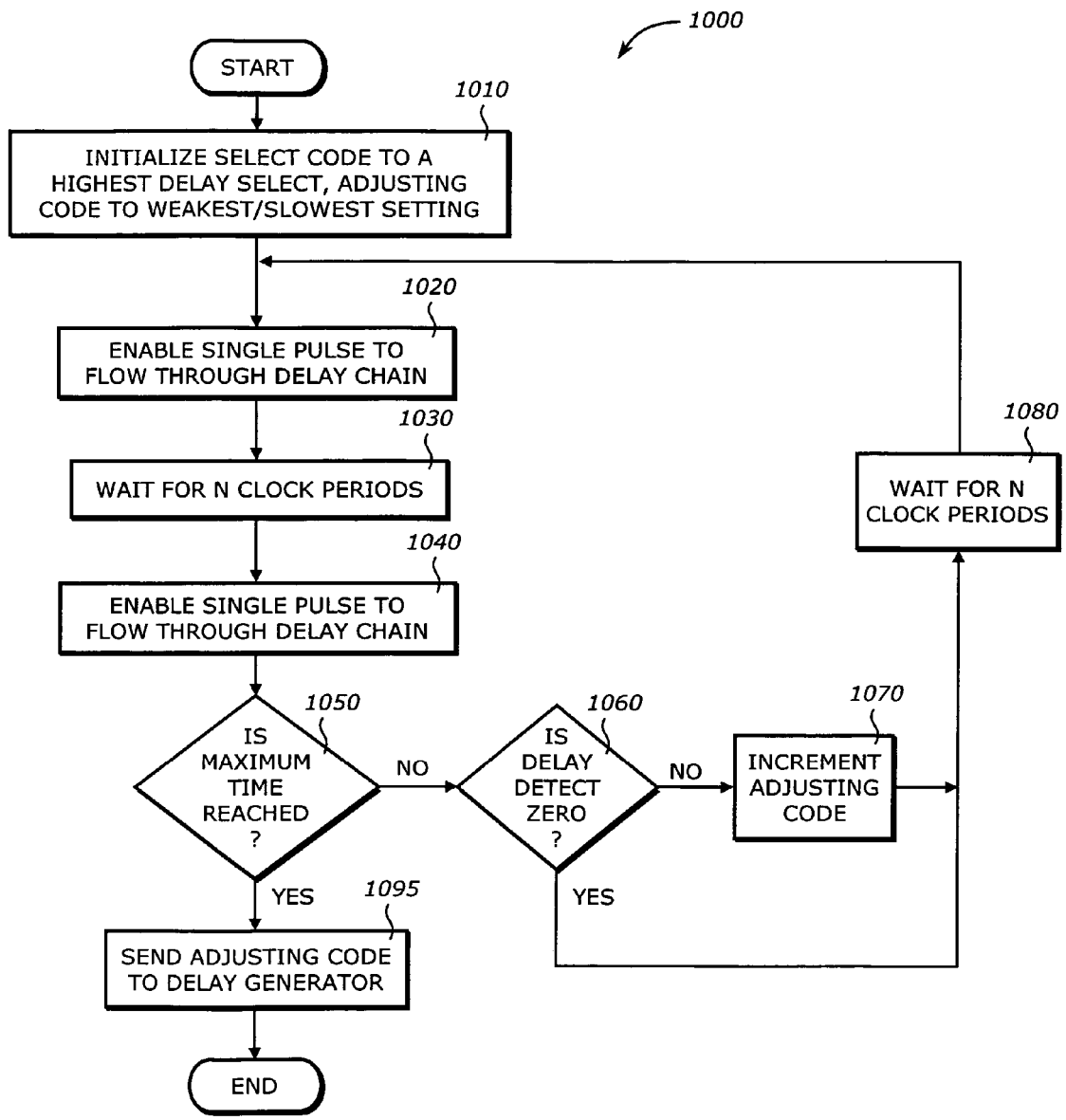
FIG. 10 is a flowchart illustrating a process to calibrate the delay generator according to one embodiment of the invention.

FIG. 10 is a flowchart illustrating a process 1000 to calibrate the delay generator according to one embodiment of the invention. The process 1000 is used by the delay generator calibration controller 242 to control calibrating the delay generator calibration circuit 232.

Upon START, the process 1000 initializes the select code, and the adjusting code in the delay generator calibration circuit 232 (Block 1010). The select code is initialized to the highest delay code, i.e., the code that corresponds to the longest delay in the chain of delay elements. For example, if 15 delay elements are used, the select code is 15. The adjusting code may be initialized to the weakest or slowest setting. Next, the process 1000 enables a single pulse to flow through the delay chain (Block 1020). Then, the process 1000 waits for N clock periods (Block 1030). In one embodiment, N is equal to 10. Next, the process 1000 enables the single pulse to flow through the delay chain again (Block 1040).

Then, the process 1000 determines if a maximum time has been reached (Block 1050). The maximum time is a time that the calibration process should have been completed. If so, the process 1000 sends the adjusting code to the delay generator (Block 1095) and is then terminated. Otherwise, the process 1000 determines if the delay detect signal is zero (Block 1060). If so, the process 1000 increments the adjusting code (Block 1070). Then, the process 1000 waits for N clock periods (Block 1080) and returns to Block 1020. If the delay detect signal is not equal to zero, the process 1000 goes to Block 1080.

Figure 11:
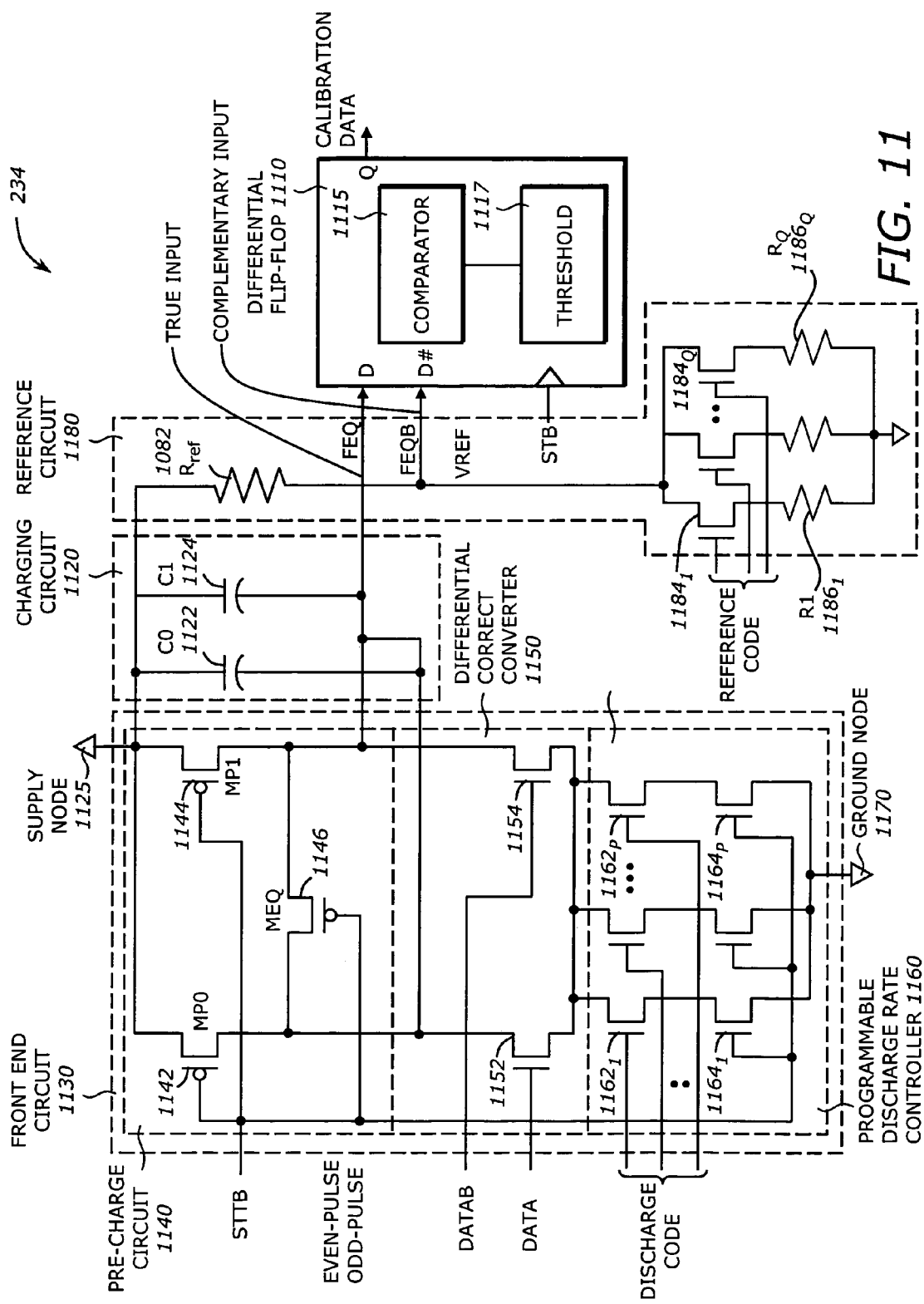
FIG. 11 is a diagram illustrating an IR calibration circuit according to one embodiment of the invention.

FIG. 11 is a diagram illustrating an IR calibration circuit 234 according to one embodiment of the invention. The IR calibration circuit 234 is similar to the IR 442/444 (FIG. 4) used in the data buffer 220. Since the IR calibration circuit 232 is located close to the IR 442/444 and uses similar elements, the process variations between the two circuits are minimal. Calibrated values obtained for the IR calibration circuit 232, therefore, are applicable for the IR 442/444. The IR calibration circuit 234 includes a differential flip-flop 1110, a charging circuit 1120, a front-end circuit 1130, and a reference circuit 1180. As in the IR 442/444, the integration pulse is referred to as the STBB signal.

The differential flip flop 1110 has two differential sense inputs FEQ and FEQB to generate a calibration data corresponding to the data DQ at a first edge STB of the integration pulse. The differential sense inputs include a true input FEQ and a complementary input FEQB. The true input FEQ is pre-charged to a supply level when the integration pulse is at a first logic level (e.g., LOW). The complementary input FEQB is connected to a reference voltage setting of the reference circuit 1180. The differential flip flop 1110 includes a comparator 1115 to generate a comparison result by comparing a difference of the true input and the reference voltage setting with a threshold 1117. The comparator provides the calibration data based on the comparison result. For example, if the comparison result indicates that the difference of the differential sense inputs is higher than the threshold 1117, then the differential flip-flop 1110 generates a HIGH received data; otherwise, it generates a LOW received data.

The charging circuit 1120 discharges the pre-charged differential sense inputs when the pulse is at a second logic level (e.g., HIGH). In one embodiment, the charging circuit 1120 includes two capacitors C0 1122 and C1 1124 that are substantially identical and are connected between the true input and a supply node 1125. Since the two capacitors are tied together and the two capacitors are identical, the discharge rate is half the discharge rate of the IR 442/444. The reason for using half the discharge rate is that the function IR 442/444 will discharge to the threshold voltage at half the integration window to accommodate the worst-case scenario where the data is switched, due to noise, in the middle of the data window.

The front-end circuit 1130 pre-charges the true input FEQ when the pulse STBB is at a first logic level (e.g., LOW) and controls discharging the true input FEQ when the pulse STBB is at the second logic level (e.g., HIGH). The front-end circuit 1130 includes a pre-charge circuit 1140, a differential current converter 1150, and a programmable discharge rate controller 1160. The pre-charge circuit 1140 drives the true input FEQ to the supply level when the pulse is at the first logic level (e.g., LOW). The differential current converter 1150 converts the data (DATA) and a complement of the data (DATAB) to differential currents at the differential sense inputs. The DATA and DATAB are connected to fixed values during calibration. In one embodiment, the DATA is tied to ground and the DATAB is tied to supply voltage level. The programmable discharge rate controller 1160 provides a programmable discharge rate to the charging circuit 1120. It includes P transistors $1\,162_1$ to $1\,162_P$ connected in parallel to provide on-resistance values corresponding to the programmable discharge rate when a discharge code is applied; and P transistors $1\,164_1$ to $1\,164_P$ connected in series with the P transistors $1\,162_1$ to $1\,162_P$ to a ground node 1170. The P transistors $1\,164_1$ to $1\,164_P$ are turned on to the ground node 1170 when the pulse is at the second logic level (e.g., HIGH).

The pre-charge circuit 1140 includes three transistors MP0 1142, MP1 1144, and MEQ 1146. When the STBB is LOW, transistors MP0 1142, MP1 1144, and MEQ 1146 are turned on, and the transistors $1\,164_1$ to $1\,164_P$ are turned off. The result is that the two capacitors C0 1122 and C1 1124 are pre-charged to a logic HIGH level as defined by the supply node 1125. The MEQ 1146 equalizes the pre-charge rates of the two capacitors C0 1122 and C1 1124 and the voltage levels. When the STBB is HIGH, transistors MP0 1142, MP1 1144, and MEQ are turned off, and the transistors 1164$_1$ to $1\,164_P$ are turned on. The transistors 1152 and 1154 in the converter 1150 convert the pseudo differential DATA and DATAB to differential currents to the true input FEQ to the flip-flop 1110. The two capacitors C0 1122 and C 1124 discharges to a voltage level according to the DATA and DATAB. The discharge rate is proportional to the time constant 2RC where C is the capacitance of the two capacitors and R is the total resistance provided by the P transistors $1162_1$ to $1162_P$ and $1164_1$ to $1164_P$. This discharge rate is slower than the discharge rate used in the functional IR 442/444.

The reference circuit 1180 includes a reference resistor $R_{ref}$ 1082, Q transistors $1184_1$ to $1184_Q$ and Q resistors $1186_1$ to $1186_Q$. The Q transistors $1184_1$ to $1184_Q$ and the Q resistors $1186_1$ to $1186_Q$ are controlled by a reference code to provide a variable voltage setting at the complementary input FEQB. The discharge code, the reference code, and the calibration data are connected to the IR calibration controller 244 (FIG. 2). The reference circuit 1180 provides a reference voltage that defines the optimal discharge voltage allowing for the maximum or desired voltage margin between the LOW and HIGH sense inputs.

Figure 12:
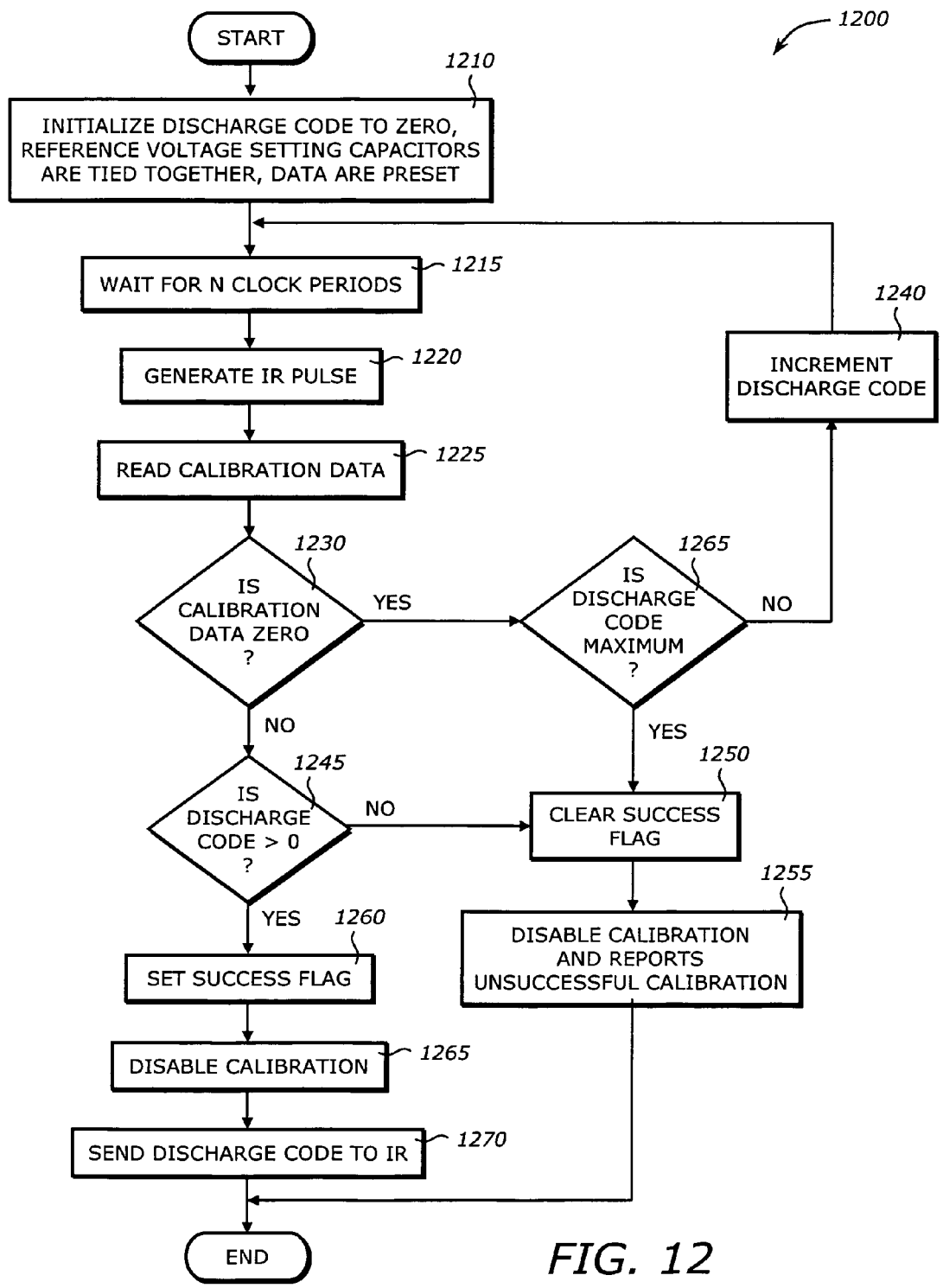
FIG. 12 is a flowchart illustrating a process to calibrate the IR according to one embodiment of the invention.

FIG. 12 is a flowchart illustrating a process 1200 to calibrate the IR according to one embodiment of the invention. The process 1200 is used by the IR calibration controller 244 to control the IR calibration circuit 234. Upon START, the process 1200 initializes the discharge code to zero and the reference code to a pre-determined reference voltage setting (Block 1210). The two capacitors in the charging circuit 1120 are tied together and the DATA and DATAB are set at ground and supply voltage levels, respectively. Next, the process 1200 waits for N clock periods (Block 1215). In one embodiment, N is equal to two. Then, the process 1200 generates the IR pulse (Block 1220). This is performed by enabling the pulse generator and the delay generator. Next, the process 1200 reads the calibration data after the integration of the data is completed (Block 1225).

Then, the process 1200 determines if the calibration data is equal to zero (Block 1230). If so, the process 1200 determines if the discharge code is maximum (Block 1235). If not, the process 1200 increments the discharge code (Block 1240) and returns to Block 1215. If the discharge code is at the maximum value, the process 1200 clears a success flag (Block 1250) to indicate that the calibration is unsuccessful. Next, the process 1200 disables the calibration and reports the unsuccessful calibration (Block 1255) and is then terminated.

If the calibration data is not equal to zero, the process 1200 determines if the discharge code is greater than zero. If not, the process 1200 goes to Block 1250. Otherwise, the process 1200 sets the success flag to indicate that the calibration is successful (Block 1260). Then, the process 1200 disables the calibration (Block 1265). Next, the process 1200 sends the discharge code to the IR 442/444 (Block 1270) and is terminated.

Margining Technique for Integration Pulse

The calibration of the delay generator and the IR provides the proper strength codes and the discharge code. It does not provide for the margins of the integration pulse. The integration pulse is positioned within the data window. However, its width and its positions with respect to the two ends of the data window are subject to PVT, device, and signal skew variations. It is therefore useful to determine the margins of the integrations pulse so that the IR may be further refined (e.g., calibrated with the proper integration pulse width and position) for optimal performance. This may be performed by the integration pulse margining controller using the delay calibration circuit and the IR.

Figure 13:
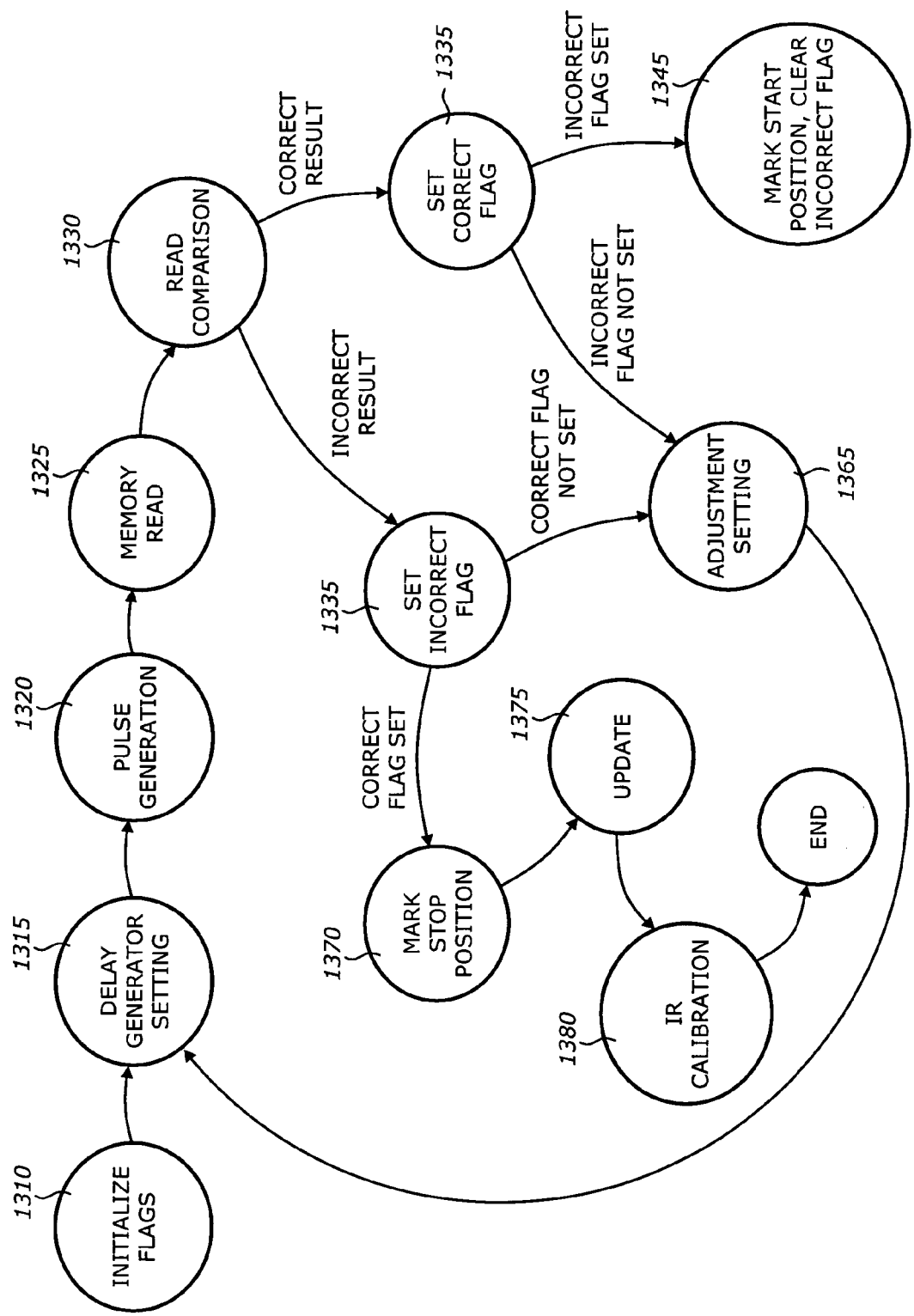
FIG. 13 is a state diagram illustrating a state machine for the integration pulse margining controller according to one embodiment of the invention.

FIG. 13 is a state diagram illustrating a state machine for the integration pulse margining controller 246 according to one embodiment of the invention. The state machine for the integration pulse margining controller 246 includes an initialization state 1310, a delay generator setting state 1315, a pulse generation state 1320, a memory read state 1325, a read comparison state 1330, a set correct flag state 1335, a mark start position and clear incorrect flag state 1345, a set incorrect flag state 1355, an adjustment setting state 1365, a mark stop position state 1370, an update state 1375, and an IR calibration state 1380. Note that these states do not necessarily represent the state of the state machine at each clock cycle. The state diagram is used to illustrate the logic and sequence of the procedure.

At the beginning, the state machine (SM) starts with the initialization state 1310 to initialize an incorrect flag and a correct flag to clear. Then, the SM transitions to the delay generator setting state 1315 to set a first select code and a second select code corresponding to a margining pulse having a margin width equal to a delay separation between the first integrating strobe and the second integrating strobe. Then, the SM transitions to the pulse generation state 1320 to enable generating the margining pulse by the pulse generator. Next, the SM transitions to the memory read state 1325 to initiate a read cycle of a known memory data. The known data has been written to the memory before.

Then, the SM transitions to the read comparison state 1330 to determine if the read memory data is correct by comparing the read data with the known data. If the result is incorrect, the SM transitions to the set incorrect flag state 1355 to set the incorrect flag. If the result is correct, the SM transitions to the set correct flag state 1335 to set the correct flag. From the set correct flag state 1335, if the incorrect flag is not set, the SM transitions to the adjustment setting state 1365 to move the margining pulse to a next position within the data window by incrementing at least one of the first and second select codes. If the incorrect flag is set, the SM transition from state 1335 to the mark start position state 1345 to mark a start position of the margining pulse, and then clears the incorrect flag after marking the start position. Then, the SM transitions to the adjustment setting state 1365. From the adjustment setting state 1365, the SM transitions to the delay generator setting state 1315. From the set incorrect state 1355, if the correct flag is not set, the SM transitions to the adjustment setting state 1365. If the correct flag is set, the SM transitions to the mark stop position state 1370 to mark a stop position of the margining pulse. Then, the SM transitions to the update state 1375 to update the first and second select codes in the delay generator to correspond to the start and stop positions, respectively, of the margining pulse. Next, the SM transitions to the IR calibration state 1380 to calibrate the IR using the updated first and second select codes.

The operations of the integration pulse margining controller 246 are to slide the integration pulse over the data window while determining if the data is read correctly. The result is marked at each position of the integration pulse. If the integration pulse is located outside the correct integration window, the data is not read correctly. Similarly, if the integration pulse is located inside the correct integration window, the data is read correctly. Therefore, by sliding the pulse from the beginning to the end of the data window and determining the read result at each position along the way, it is possible to mark the start and stop positions of the proper integration window. The start position is at the transition of incorrect reading to correct reading when the pulse begins to enter the correct integration window. The stop position is at the transition of correct reading to incorrect reading when the pulse moves outside of the correct integration window.

Figure 14A:
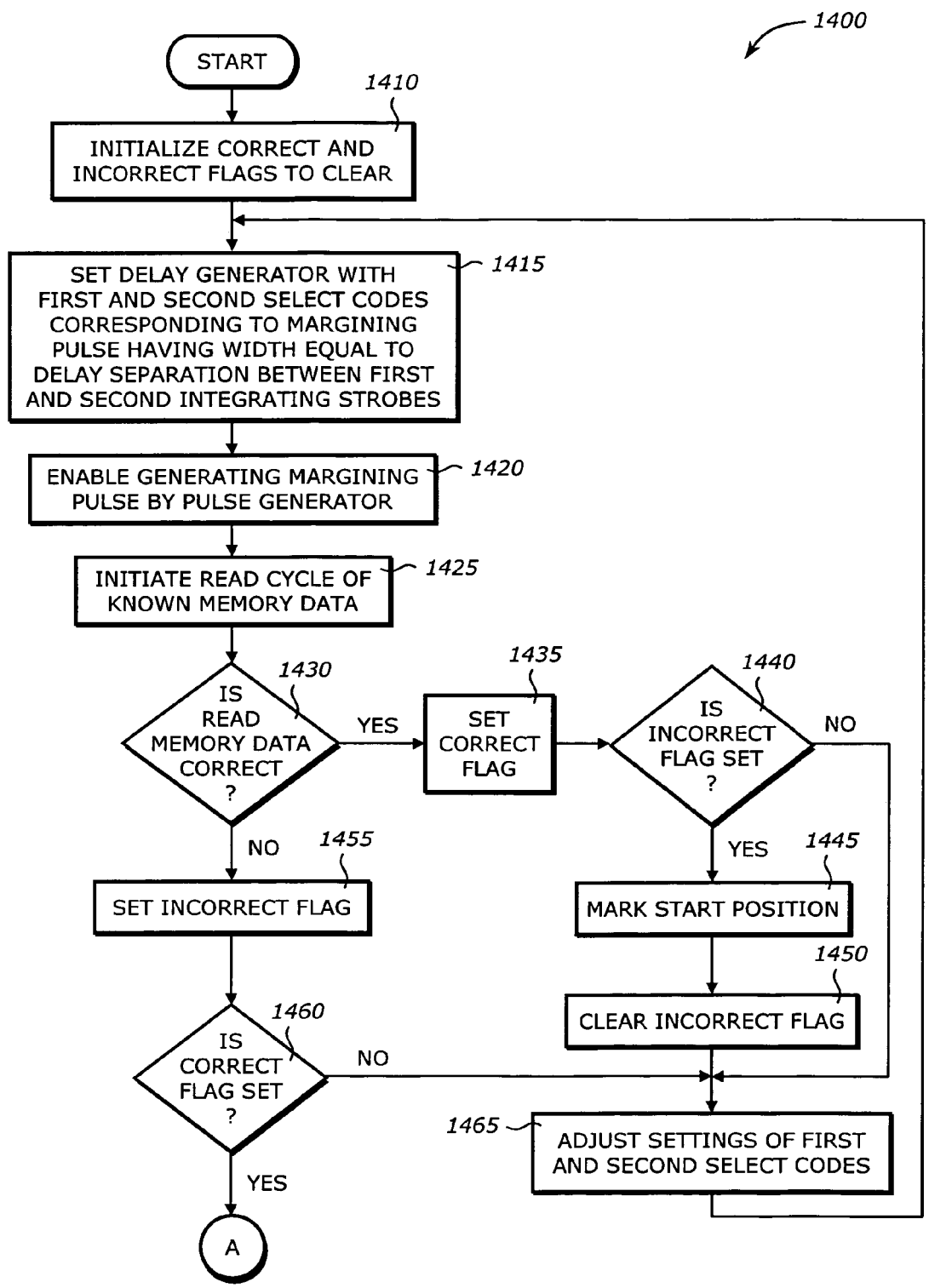
FIG. 14A is a flowchart illustrating the first portion of a process to calibrate the integration pulse for the IR according to one embodiment of the invention.

FIG. 14A is a flowchart illustrating the first portion of a process 1400 to calibrate the integration pulse for the IR according to one embodiment of the invention. Upon START, the process 1400 initializes the correct and incorrect flags to clear (Block 1410). Next, the process 1400 sets the delay generator with first and second select codes corresponding to a margining pulse having width equal to the delay separation between the first and second integrating strobes (Block 1415). Then, the process 1400 enables generating the margining pulse by the pulse generator (Block 1420). Next, the process 1400 initiates a read cycle of known memory data (Block 1425).

Then, the process 1400 determines if the read memory data is correct (Block 1430). If so, the process 1400 sets the correct flag (Block 1435). Then, the process 1400 determines if the incorrect flag is set (Block 1440). If so, the process 1400 marks the start position (Block 1445). Then, the process 1400 clears the incorrect flag (Block 1450) and goes to Block 1465. If the incorrect flag is not set, the process 1400 goes to Block 1465. If the read memory data is not correct, the process 1400 sets the incorrect flag (Block 1455). Then, the process 1400 determines if the correct flag is set (Block 1460). If not, the process 1400 adjusts the setting of the first and second select codes (Block 1465) and then returns to Block 1415. Otherwise, the process 1400 continues to continuation terminator A.

Figure 14B:
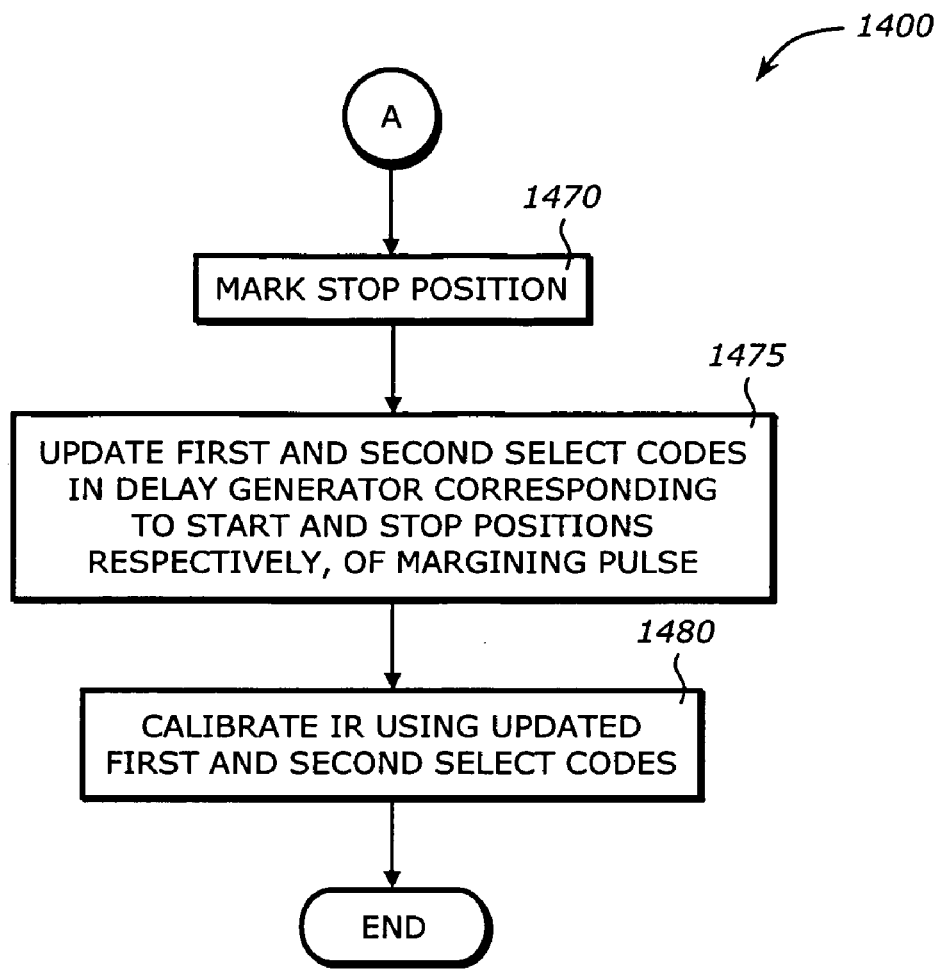
FIG. 14B is a flowchart illustrating the second portion of a process to calibrate the integration pulse for the IR according to one embodiment of the invention.

FIG. 14B is a flowchart illustrating the second portion of a process 1400 to calibrate the integration pulse for the IR according to one embodiment of the invention. Starting from continuation terminator A, the process 1400 marks the stop position (Block 1470). Then, the process 1400 updates the first and second select codes in the delay generator corresponding to the start and stop positions, respectively, of the margining pulse (Block 1475). Next, the process 1400 calibrates the IR using the updated first and second select codes for the delay generator (Block 1480) and is then terminated.

Figure 15:
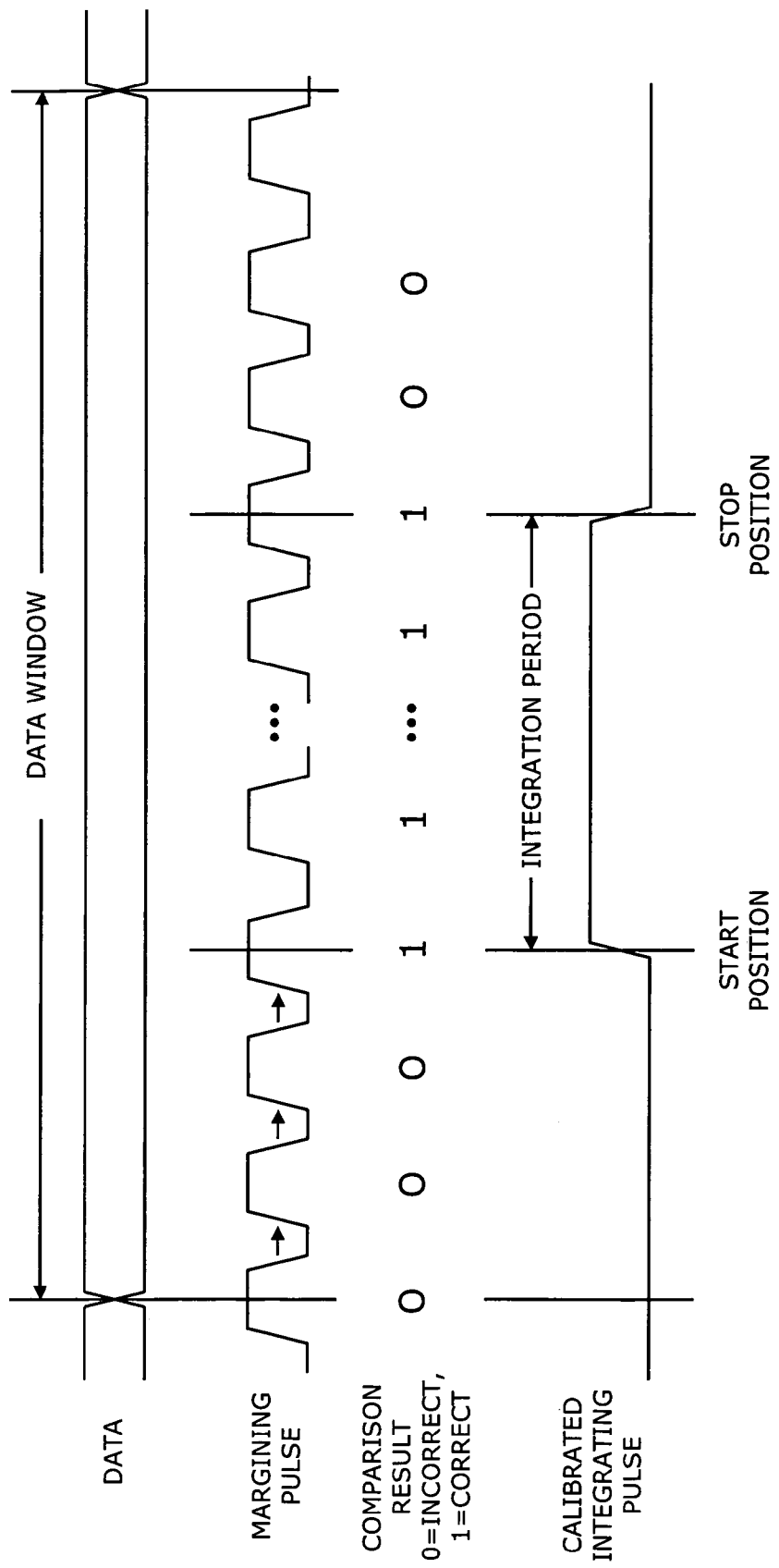
FIG. 15 is a timing diagram illustrating margining technique for calibrating the integration pulse according to one embodiment of the invention.

FIG. 15 is a timing diagram illustrating margining technique for calibrating the integration pulse according to one embodiment of the invention. The timing diagram shows the DATA waveform, the margining pulse, the comparison result, and the calibrated integrating pulse.

The DATA waveform shows the data window where the data is available for reading. The margining pulse slides across the data window starting from the beginning of the data window. At each position of the pulse, a memory read is performed and a comparison is made. The comparison result shows the results of the comparisons. A zero indicates an incorrect read and a one indicates a correct read. As the margining pulse moves across the data window, the comparison result shows a sequence of 00011111 . . . 111000, where a transition from 0 to 1 corresponds to the start of the integration window and a transition from 0 to 1 corresponds to the stop of the integration window.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. The An apparatus comprising:
   a delay calibration circuit to calibrate an adjusting code of a chain of delay elements and positioning of at least one integrating strobe used to define an integration window for an integrating receiver;
   an integrating receiver pulse generator coupled to the delay calibration circuit to generate an integrating receiver pulse from the at least one integrating strobe;
   a calibration controller coupled to the delay calibration circuit to control calibrating the adjusting code and the positioning of the at least one integrating strobe; and
   an integrating receiver calibration circuit coupled to the integrating receiver pulse generator to calibrate a discharge code of a programmable discharge rate controller in the integrating receiver that integrates a data synchronizing with a data strobe, the integrating receiver calibration circuit being controlled by the calibration controller.

2. The apparatus of claim 1 wherein the delay calibration circuit comprises:
   a delay calibration pulse generator to generate a delay calibration pulse having a pre-defined period;
   a chain of P delay elements coupled to the calibration pulse generator to delay the delay calibration pulse, the chain of P delay elements having P delay taps, each delay element having a delay time, the delay time being controlled by the adjusting code; and a multiplexer having P inputs connected to the P delay taps to provide the delayed delay calibration pulse when selected by a select code.

3. The apparatus of claim 2 wherein the pre-defined period is a data window time.

4. The apparatus of claim 1 wherein the calibration controller comprises:

a delay generator calibration controller to determine the adjusting code corresponding to a cumulative delay time of the data window at a highest select code.

5. The apparatus of claim 1 wherein the integrating receiver calibration circuit comprises:

a differential flip flop having differential sense inputs to generate a calibration data corresponding to a first edge of the pulse, the differential sense inputs including a true input and a complementary input, the true input being pre-charged to a supply level when the pulse is at a first logic level;

a reference circuit to provide a reference voltage setting at the complement input of the differential flip flop;

a charging circuit coupled to the differential flip flop to discharge the true input when the integrating receiver calibration pulse is at a second logic level; and a front-end circuit to pre-charge the differential sense inputs when the integrating receiver pulse is at a first logic level and to control discharging the differential sense inputs when the integrating receiver pulse is at the second logic level.

6. The apparatus of claim 5 wherein the differential flip flop comprises:

a comparator to generate a comparison result by comparing a difference of the differential sense inputs with a threshold, the comparator providing the calibration data based on the comparison result.

7. The apparatus of claim 5 wherein the charging circuit comprises:

two capacitors that are substantially identical connected between the true input of the differential sense inputs and a supply node.

8. The apparatus of claim 5 wherein the front end circuit comprises:

a pre-charge circuit to drive the true input to the supply level when the integrating receiver pulse is at the first logic level;

a differential current converter coupled to the pre-charge circuit to convert the data and a complement of the data to differential currents at the differential sense inputs, the data and the complement of the data being connected to fixed and complementary voltage levels; and a programmable discharge rate controller coupled to the differential current converter to provide a programmable discharge rate to the charging circuit.

9. The apparatus of claim 8 wherein the programmable discharge rate controller comprises:

a first plurality of transistors connected in parallel to provide on-resistance values corresponding to the programmable discharge rate when a discharge code is applied; and a second plurality of transistors connected in series with the first plurality of transistors, the second plurality of transistors being turned on to a ground node when the IR calibration pulse is at the second logic level.

10. The apparatus of claim 9 wherein the calibration controller comprises:

an integrating receiver calibration controller to determine the discharge code corresponding to a discharge rate at which the charging circuit discharges the true input to the reference voltage setting at end of the integration period, the determined discharge code being sent to the integrating receiver.

11. The apparatus of claim 1 wherein the delay calibration circuit determines the adjusting code such that a total delay is equal to width of an input pulse.

12. The apparatus of claim 11 wherein the width of the input pulse is equal to a data valid window or data bit time.

13. A method comprising:

calibrating adjusting code of a chain of delay elements used in a delay generator by a delay calibration circuit;

calibrating positioning of at least one integrating strobe used to define an integration window for an integrating receiver by the delay calibration circuit;

generating an integrating receiver pulse from the at least one integrating strobe by an integrating receiver pulse generator coupled to the delay calibration circuit;

controlling calibrating the adjusting code and the positioning of the at least one integrating strobe by a calibration controller coupled to the delay calibration circuit; and calibrating a discharge code of a programmable discharge rate controller in the integrating receiver that integrates a data synchronizing with a data strobe by an integrating receiver calibration circuit coupled to the integrating receiver pulse generator, the integrating receiver calibration circuit being controlled by the calibration controller.

14. The method of claim 13 wherein calibrating the adjusting code comprises:

generating a delay calibration pulse having a pre-defined period;

delaying the delay calibration pulse by a delay time equal to the pre-defined period; and determining position of the delayed delay calibration pulse.

15. The method of claim 14 wherein delaying the calibration pulse comprises:

determining the adjusting code corresponding to a cumulative delay time of the data window at a highest select code; and sending the adjusting code to the delay generator.

16. The method of claim 14 wherein the pre-defined period is a data window time.

17. The method of claim 13 wherein calibrating the discharge code comprises:

pre-charging a true input to a differential flip flop;

discharging the pre-charged true input at a discharging rate slower than the discharging rate of the integrating receiver;

adjusting a voltage reference at a complementary input of the differential flip-flop corresponding to a desired voltage margin;

determining the discharge code that corresponds to a detection of data at the desired voltage margin; and sending the determined discharge code to the integrating receiver.

18. The method of claim 13 wherein calibrating the adjusting code comprises determining the adjusting code such that a total delay is equal to width of an input pulse.

19. The method of claim 18 wherein the width of the input pulse is equal to a data valid window or data bit time.

20. A system comprising:
a graphics controller to process graphic data;
a memory having a plurality of memory devices to store the graphic data; and
a memory controller coupled to the graphics processor and the memory, the memory controller having a memory interface circuit to interface to the memory devices, the memory interface circuit comprising:
  a delay calibration circuit to calibrate an adjusting code of a chain of delay elements and positioning of at least one integrating strobe used to define an integration window for an integrating receiver,
  an integrating receiver pulse generator coupled to the delay calibration circuit to generate an integrating receiver pulse from the at least one integrating strobe,
  a calibration controller coupled to the delay calibration circuit to control calibrating the adjusting code and the positioning of the at least one integrating strobe, and
  an integrating receiver calibration circuit coupled to the integrating receiver pulse generator to calibrate a discharge code of a programmable discharge rate controller in the integrating receiver that integrates a data synchronizing with a data strobe, the integrating receiver calibration circuit being controlled by the calibration controller.

21. The system of claim 20 wherein the delay calibration circuit comprises:
  a delay calibration pulse generator to generate a delay calibration pulse having a pre-defined period;
  a chain of P delay elements coupled to the calibration pulse generator to delay the delay calibration pulse, the chain of P delay elements having P delay taps, each delay element having a delay time, the delay time being controlled by the adjusting code; and
  a multiplexer having P inputs connected to the P delay taps to provide the delayed delay calibration pulse when selected by a select code.

22. The system of claim 21 wherein the pre-defined period is a data window time.

23. The apparatus of claim 20 wherein the calibration controller comprises:
  a delay generator calibration controller to determine the adjusting code corresponding to a cumulative delay time of the data window at a highest select code.

24. The system of claim 20 wherein the integrating receiver calibration circuit comprises:
  a differential flip flop having differential sense inputs to generate a calibration data corresponding to the at a first edge of the pulse, the differential sense inputs including a true input and a complementary input, the true input being pre-charged to a supply level when the pulse is at a first logic level;
  a reference circuit to provide a reference voltage setting at the complement input of the differential flip flop;
  a charging circuit coupled to the differential flip flop to discharge the true input when the integrating receiver pulse is at a second logic level; and
  a front-end circuit to pre-charge the differential sense inputs when the integrating receiver pulse is at a first logic level and to control discharging the differential sense inputs when the integrating receiver pulse is at the second logic level.

25. The system of claim 24 wherein the charging circuit comprises:
  two capacitors that are substantially identical connected between the true input of the differential sense inputs and a supply node.

26. The system of claim 20 wherein the delay calibration circuit determines the adjusting code such that a total delay is equal to width of an input pulse.

27. The system of claim 26 wherein the width of the input pulse is equal to a data valid window or data bit time.

\* \* \* \* \*

UNITED STATES PATENT AND TRADEMARK OFFICE
CERTIFICATE OF CORRECTION

PATENT NO. : 7,602,859 B2
APPLICATION NO. : 11/118228
DATED : October 13, 2009
INVENTOR(S) : Cheng et al.

Page 1 of 1

It is certified that error appears in the above-identified patent and that said Letters Patent is hereby corrected as shown below:

In column 16, at line 43 delete, "The"

Signed and Sealed this

Twenty-ninth Day of December, 2009

David J. Kappos
*Director of the United States Patent and Trademark Office*